(12) United States Patent
Haga et al.

(10) Patent No.: US 11,822,725 B2
(45) Date of Patent: Nov. 21, 2023

(54) TACTILE PRESENTATION DEVICE AND CONTROL METHOD

(71) Applicant: TIANMA MICROELECTRONICS CO., LTD., Shenzhen (CN)

(72) Inventors: Hiroshi Haga, Kanagawa (JP); Daisuke Sugimoto, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/661,968

(22) Filed: May 4, 2022

(65) Prior Publication Data

US 2022/0261082 A1    Aug. 18, 2022

Related U.S. Application Data

(62) Division of application No. 17/247,816, filed on Dec. 23, 2020, now Pat. No. 11,353,961, which is a
(Continued)

(30) Foreign Application Priority Data

Oct. 21, 2016 (JP) ................... 2016-207062
Aug. 10, 2017 (JP) ................... 2017-155769

(51) Int. Cl.
  *G06F 3/01*    (2006.01)
  *G06F 3/041*   (2006.01)
  *G06F 3/044*   (2006.01)

(52) U.S. Cl.
  CPC ............. *G06F 3/016* (2013.01); *G06F 3/044* (2013.01); *G06F 3/0416* (2013.01); *G06F 3/0446* (2019.05); *G06F 3/04166* (2019.05)

(58) Field of Classification Search
  CPC .... G06F 3/016; G06F 3/0416; G06F 3/04166; G06F 3/044; G06F 3/0446; G06F 3/0412;
  (Continued)

(56) References Cited

U.S. PATENT DOCUMENTS 5,565,658 A    10/1996 Gerpheide et al.
2011/0285666 A1  11/2011 Poupyrev et al.
(Continued)

FOREIGN PATENT DOCUMENTS

JP    H11-505641 A    5/1999
JP    2011-002926      1/2011
(Continued)

OTHER PUBLICATIONS

Office Action issued in Japanese Patent Application No. 2017-155769 dated Aug. 17, 2021.
(Continued)

*Primary Examiner* — Abhishek Sarma
(74) *Attorney, Agent, or Firm* — NIXON & VANDERHYE

(57) ABSTRACT

A tactile presentation device comprising: a contact face; a plurality of electrodes arranged along the contact face; a first control unit controlling operations of the electrodes for detecting contact or approach of an object toward the contact face; a second control unit controlling operations of the electrodes for presenting a tactile sense to the contact face; and a third control unit causing a part of the plurality of the electrodes to be controlled by the first control unit, sequentially changing the electrode to be controlled by the first control unit to another electrode among the plurality of the electrodes, and causing electrodes other than the electrode that is controlled by the first control unit to be controlled by the second control unit.

2 Claims, 32 Drawing Sheets

Related U.S. Application Data division of application No. 15/789,122, filed on Oct. 20, 2017, now Pat. No. 10,908,688.

(58) Field of Classification Search
CPC . G06F 3/04164; G06F 3/04847; G06F 3/0488
See application file for complete search history.

(56) References Cited

U.S. PATENT DOCUMENTS

| | | |
|---|---|---|
| 2011/0285667 A1 | 11/2011 | Poupyrev et al. |
| 2012/0062516 A1 | 3/2012 | Chen et al. |
| 2013/0307789 A1 | 11/2013 | Karamath et al. |
| 2014/0071088 A1* | 3/2014 | Hong .............. G06F 3/04166 345/174 |
| 2014/0146005 A1* | 5/2014 | Hong .............. G06F 3/04166 345/174 |
| 2014/0176486 A1 | 6/2014 | Lee et al. |
| 2014/0025848 A1 | 8/2014 | Ogura et al. |
| 2015/0103024 A1* | 4/2015 | Haga .............. G06F 3/0448 345/173 |
| 2015/0130770 A1 | 5/2015 | Takatori |
| 2016/0357342 A1 | 12/2016 | Olley et al. |

FOREIGN PATENT DOCUMENTS

| | | |
|---|---|---|
| JP | 2011-248884 | 12/2011 |
| JP | 2012529091 | 11/2012 |
| JP | 2014-106733 A | 6/2014 |
| JP | 2014-106743 A | 6/2014 |
| JP | 2015-111391 A | 6/2015 |
| WO | WO 2014/002405 | 1/2014 |

OTHER PUBLICATIONS

U.S. Appl. No. 17/247,816, filed Dec. 23, 2020.
U.S. Appl. No. 15/789,122, filed Oct. 20, 2017.

* cited by examiner

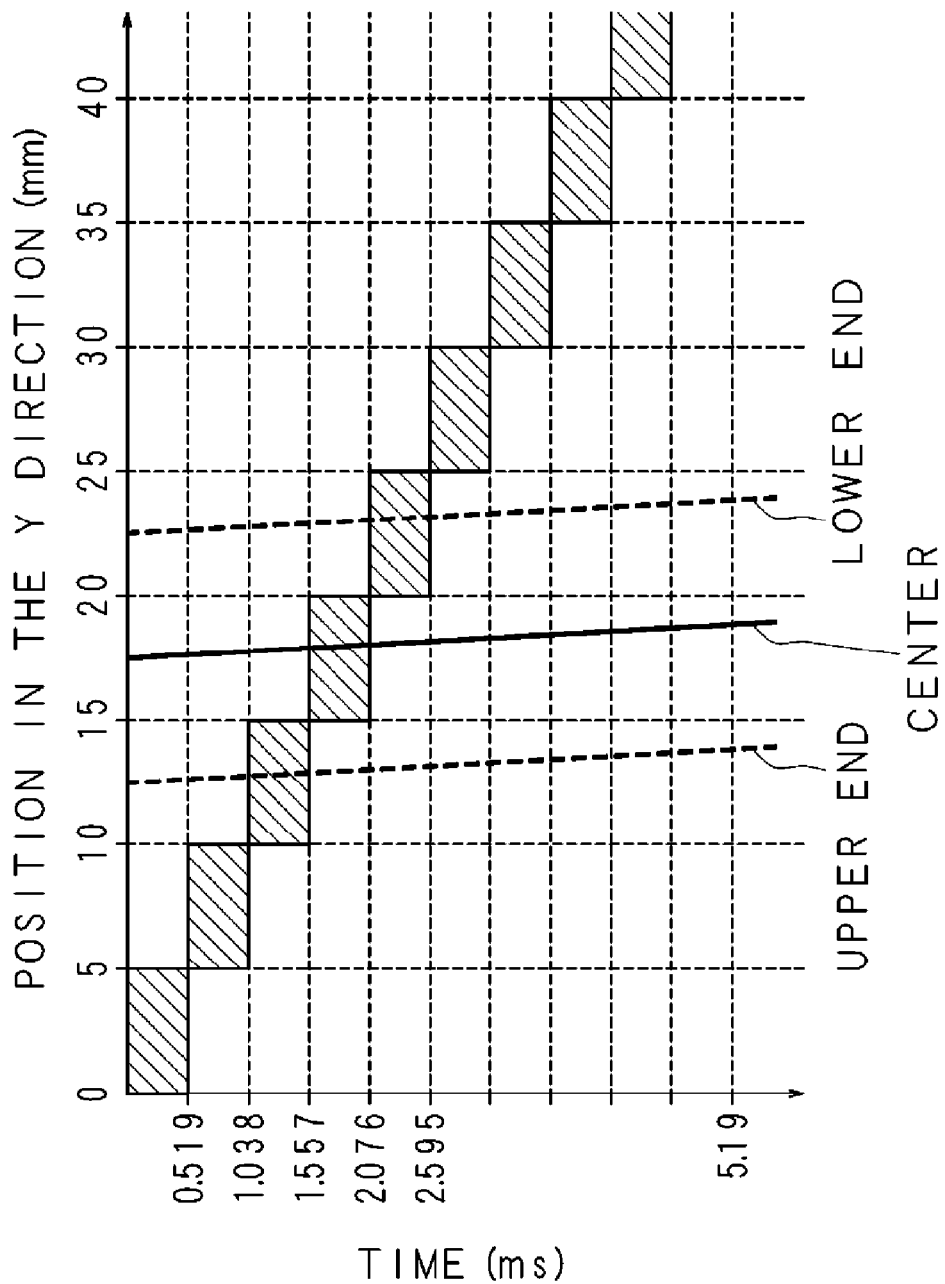

FIG.18

| POSITION OF ELECTRODE | | ELAPSE OF TIME | | | | | | | | |
|---|---|---|---|---|---|---|---|---|---|---|
| X | Y | 1 | 2 | 3 | 4 | 5 | 6 | 7 | 8 | 9 |
| 0 | 0 | ▨ | | | | | | | | |
| | 1 | | ▨ | | | | | | | |
| | 2 | | | ▨ | | | | | | |
| | 3 | ▨ | | | | | | | | |
| | 4 | | ▨ | | | | | | | |
| | 5 | | | ▨ | | | | | | |
| 1 | 0 | | | | ▨ | | | | | |
| | 1 | | | | | ▨ | | | | |
| | 2 | | | | | | ▨ | | | |
| | 3 | | | | ▨ | | | | | |
| | 4 | | | | | ▨ | | | | |
| | 5 | | | | | | ▨ | | | |
| 2 | 0 | | | | | | | ▨ | | |
| | 1 | | | | | | | | ▨ | |
| | 2 | | | | | | | | | ▨ |
| | 3 | | | | | | | ▨ | | |
| | 4 | | | | | | | | ▨ | |
| | 5 | | | | | | | | | ▨ |
| 3 | 0 | ▨ | | | | | | | | |
| | 1 | | ▨ | | | | | | | |
| | 2 | | | ▨ | | | | | | |
| | 3 | ▨ | | | | | | | | |
| | 4 | | ▨ | | | | | | | |
| | 5 | | | ▨ | | | | | | |
| 4 | 0 | | | | ▨ | | | | | |
| | 1 | | | | | ▨ | | | | |
| | 2 | | | | | | ▨ | | | |
| | 3 | | | | ▨ | | | | | |
| | 4 | | | | | ▨ | | | | |
| | 5 | | | | | | ▨ | | | |
| 5 | 0 | | | | | | | ▨ | | |
| | 1 | | | | | | | | ▨ | |
| | 2 | | | | | | | | | ▨ |
| | 3 | | | | | | | ▨ | | |
| | 4 | | | | | | | | ▨ | |
| | 5 | | | | | | | | | ▨ |
| 6 | 0 | ▨ | | | | | | | | |
| | 1 | | ▨ | | | | | | | |
| | 2 | | | ▨ | | | | | | |
| | 3 | ▨ | | | | | | | | |
| | 4 | | ▨ | | | | | | | |
| | 5 | | | ▨ | | | | | | |
| 7 | 0 | | | | ▨ | | | | | |
| | 1 | | | | | ▨ | | | | |
| | 2 | | | | | | ▨ | | | |
| | 3 | | | | ▨ | | | | | |
| | 4 | | | | | ▨ | | | | |
| | 5 | | | | | | ▨ | | | |
| 8 | 0 | | | | | | | ▨ | | |
| | 1 | | | | | | | | ▨ | |
| | 2 | | | | | | | | | ▨ |
| | 3 | | | | | | | ▨ | | |
| | 4 | | | | | | | | ▨ | |
| | 5 | | | | | | | | | ▨ |

FIG. 21

F I G. 27 A
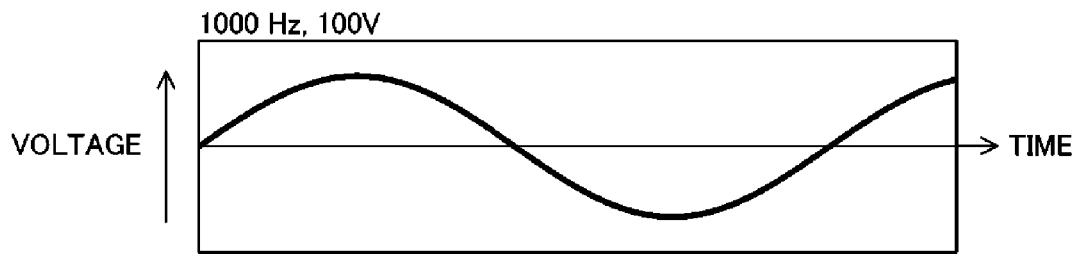
F I G. 27 B
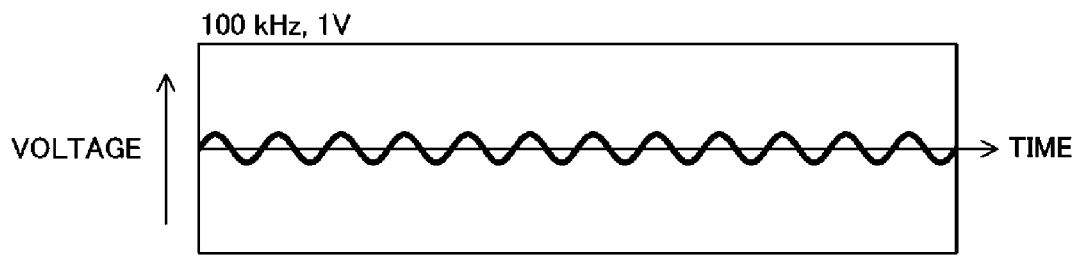
F I G. 27 C
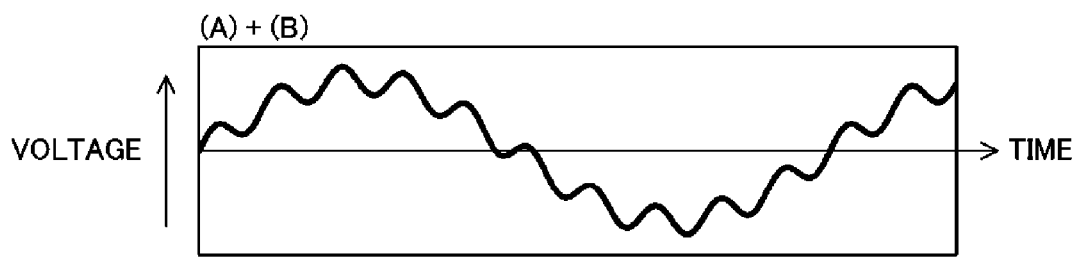
F I G. 27 D
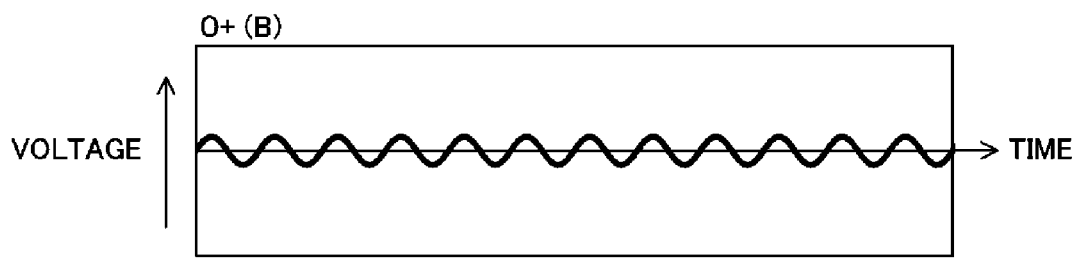

F I G. 2 9 A
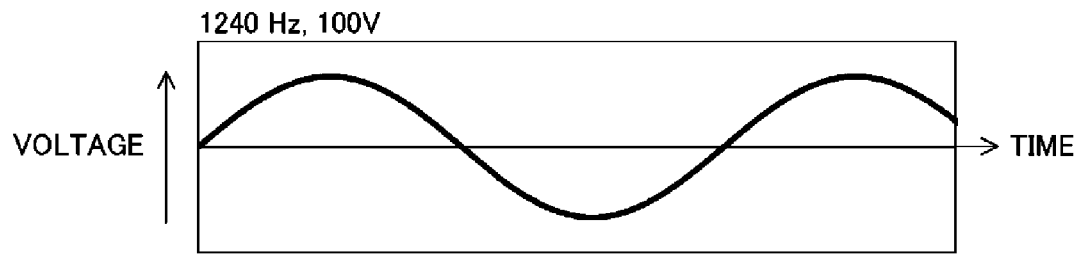
F I G. 2 9 B
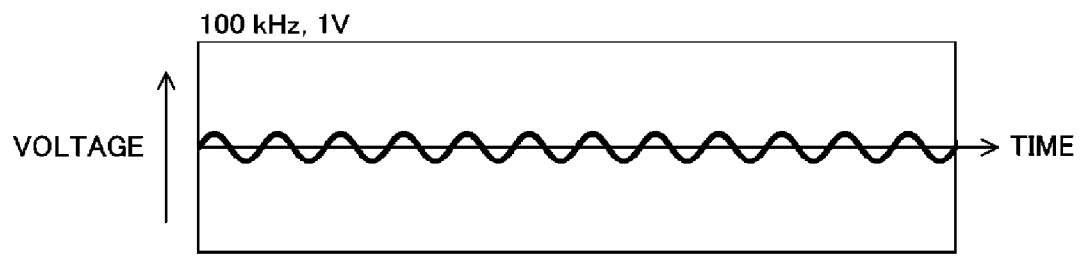
F I G. 2 9 C
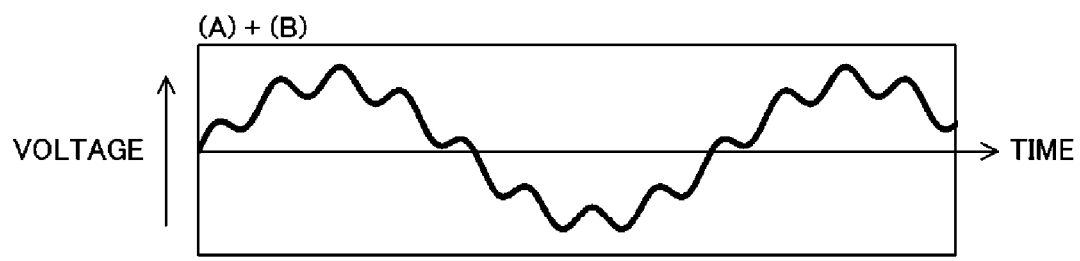
F I G. 2 9 D
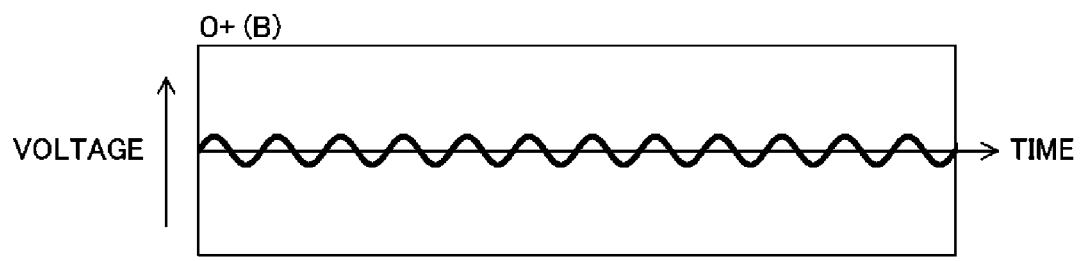

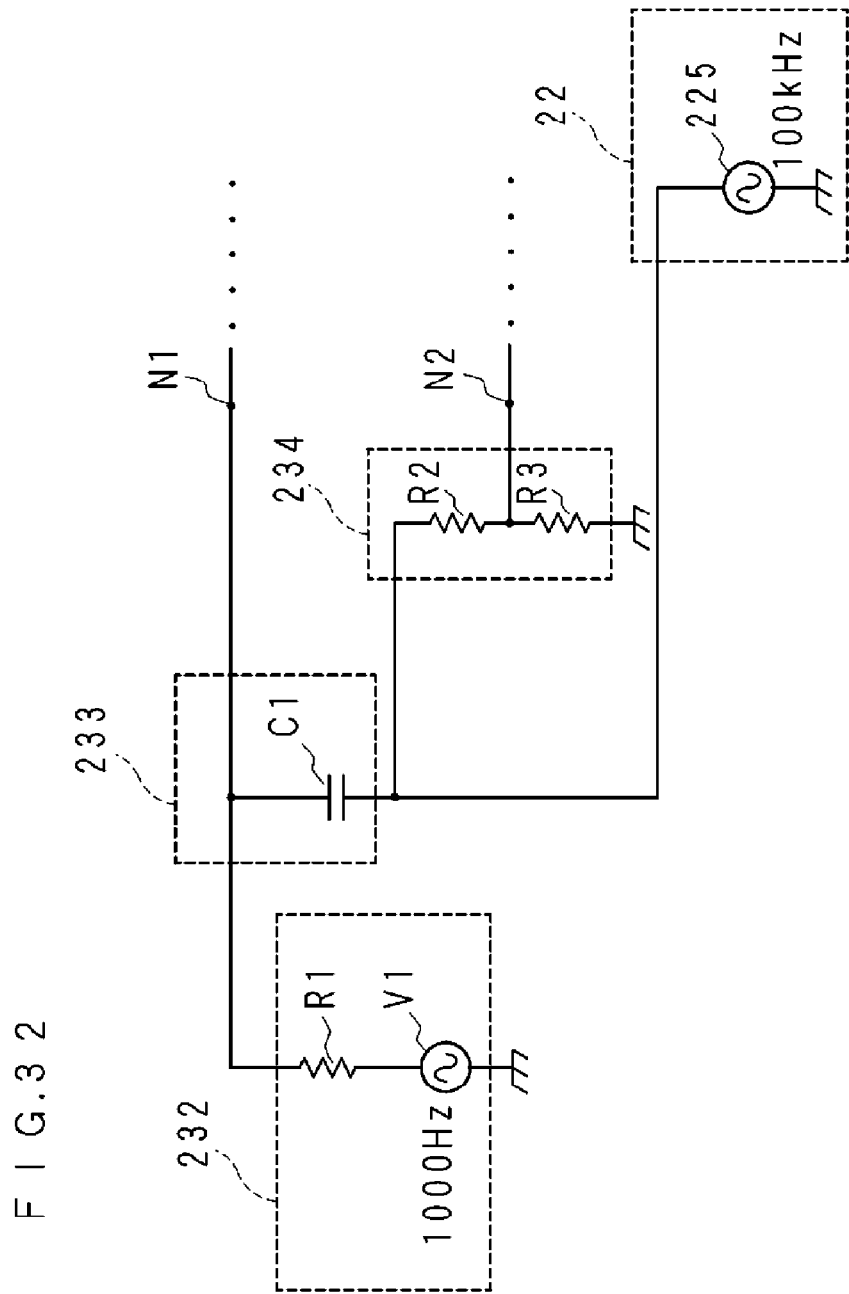

TACTILE PRESENTATION DEVICE AND CONTROL METHOD

CROSS-REFERENCE TO RELATED APPLICATION

This application is a divisional of U.S. patent application Ser. No. 17/247,816 filed on Dec. 23, 2020, which is a divisional of U.S. patent application Ser. No. 15/789,122 filed on Oct. 20, 2017, which claims priority under 35 U.S.C. § 119(a) on Patent Application No. 2016-207062 filed in Japan on Oct. 21, 2016 and Patent Application No. 2017-155769 filed in Japan on Aug. 10, 2017, the entire contents of which are hereby incorporated by reference.

BACKGROUND OF THE INVENTION

Field of the Invention

The present invention relates to a tactile presentation device and a control method for controlling a tactile presentation device presenting a tactile sense on a contact face together with detecting contact on the contact face.

Description of the Related Art

Technologies for presenting a tactile sense to a surface of a touch panel using an electrostatic force have been developed. The presentation of a tactile sense represents causing a texture sense that can be perceived as a tactile sense when a user is brought into contact with the surface of an object with which the user can be brought into contact. For example, in a case where a tactile sense is presented to a specific position on the surface of a touch panel, a user brought into contact with the surface of the touch panel can notice the specific position on the surface using a tactile sense. In PCT International Publication No. 2014/002405 and U.S. Patent Application Publication No. 2013/0307789, tactile presentation devices each presenting a tactile sense to the surface of a touch panel are disclosed.

A tactile presentation device including a touch panel needs to have both a function for detecting a contact position on the surface of the touch panel and a function for presenting a tactile sense to the surface of the touch panel. In the tactile presentation device disclosed in PCT International Publication No. 2014/002405, a plurality of electrodes are arranged on in a planar shape, and voltages used for detecting a contact position are supplied to the plurality of electrode in a certain period, and voltages used for presenting a tactile sense are supplied to the plurality of electrodes in the other period.

Accordingly, the tactile presentation device operates for detecting a contact position during the certain period and operates to present a tactile sense during the other period. The function for detecting a contact position on the surface of the touch panel and the function for presenting a tactile sense to the surface of the touch panel are realized alternatingly in time.

SUMMARY OF THE INVENTION

In the tactile presentation device disclosed in PCT International Publication No. 2014/002405, in the period in which the tactile presentation device operates to detect a contact position on the surface of the touch panel, a tactile sense cannot be presented to the surface of the touch panel. For this reason, there is a problem in that a tactile sense felt by a user during the use of the tactile presentation device is interrupted.

A tactile presentation device according to an aspect of the present disclosure, comprising: a contact face; a plurality of electrodes arranged along the contact face; a first control unit controlling operations of the electrodes for detecting contact or approach of an object toward the contact face; a second control unit controlling operations of the electrodes for presenting a tactile sense to the contact face; and a third control unit causing a part of the plurality of electrodes to be controlled by the first control unit, sequentially changing the electrode to be controlled by the first control unit to another electrode among the plurality of electrodes, and causing electrodes other than the electrode that is controlled by the first control unit to be controlled by the second control unit.

In a tactile presentation device according to the present disclosure, a plurality of electrodes are arranged along a contact face. Some electrodes are used for detecting contact or approach of an object toward the contact face, and the other electrodes are used for presenting a tactile sense to the contact face. The electrodes used for detecting contact or approach of an object toward the contact face are sequentially changed. Each of the electrodes are used for detecting contact or approach of an object at a specific timing and is used for presenting a tactile sense at the other timings.

The above and further objects and features will more fully be apparent from the following detailed description with accompanying drawings.

It is to be understood that both the foregoing general description and the following detailed description are exemplary and explanatory and are not restrictive of this disclosure.

BRIEF DESCRIPTION OF THE DRAWINGS

FIG. 11 is a schematic view that illustrates a relation between time and the positions of a contact portion and an X electrode;

FIG. 18 is a timing diagram that illustrates an example of a change in the state of each electrode with respect to time according to Embodiment 3;

FIG. 21 is a timing diagram that illustrates an example of the operation of each electrode according to Embodiment 4;

FIGS. 27A to 27D are graphs that schematically illustrate the waveforms of voltages acquired by an X electrode driving circuit according to Embodiment 6;

FIGS. 29A to 29D are graphs that schematically illustrate the waveforms of voltages acquired by a Y electrode driving circuit according to Embodiment 6;

FIG. 32 is a circuit diagram that illustrates an example of the configuration of voltage superimposing units according to Embodiment 6.

DESCRIPTION OF THE PREFERRED EMBODIMENTS

Hereinafter, embodiments of the present disclosure will be described more specifically with reference to the drawings.

Embodiment 1

Figure 1:
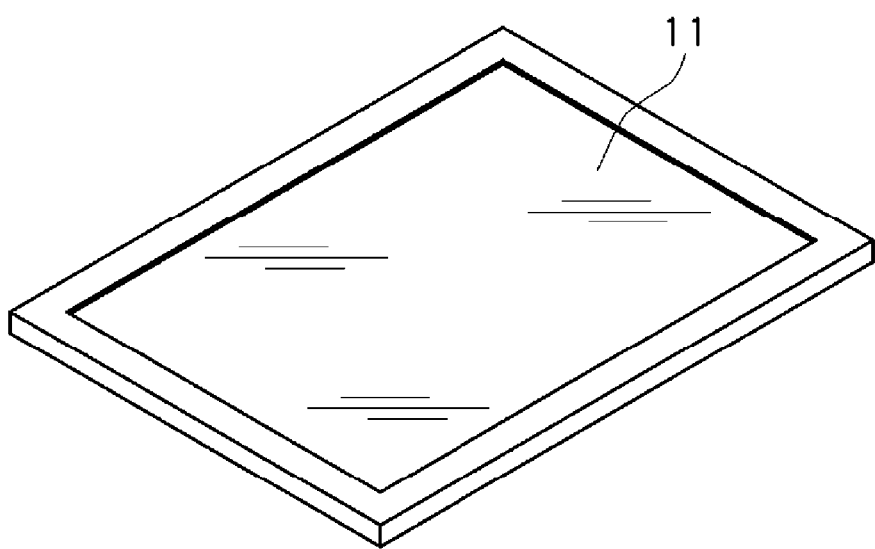
FIG. 1 is a schematic perspective view that illustrates an example of the outer appearance of a tactile presentation device.

FIG. 1 is a schematic perspective view that illustrates an example of the outer appearance of a tactile presentation device. The tactile presentation device is a computer such as a smartphone or a tablet computer. The tactile presentation device includes a planar contact face 11 for contact using a user's finger. On the contact face 11, an image is displayed, and, when a user's finger is brought into contact with the contact face 11, a tactile sense is presented, and a contact position on the contact face 11 is detected.

Figure 2:
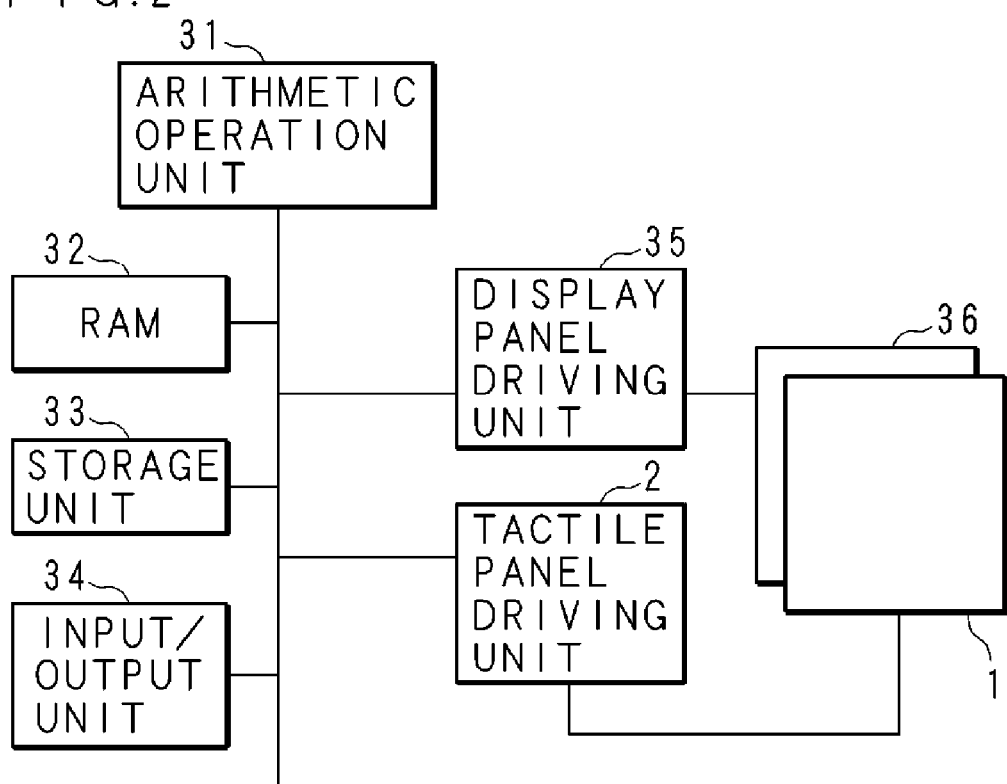
FIG. 2 is a block diagram that illustrates an example of the internal functional configurations of the tactile presentation device.

FIG. 2 is a block diagram that illustrates an example of the internal functional configurations of a tactile presentation device. The tactile presentation device includes: an arithmetic operation unit 31 that performs an arithmetic operation; a random access memory (RAM) 32 that stores temporary data; a storage unit 33 that has non-volatility; and an input/output unit 34 performing input/output of data. The storage unit 33 is, for example, a hard disk or a nonvolatile semiconductor memory. The input/output unit 34, for example, is a communication unit that performs wired or wireless communication with an external device of the tactile presentation device. In addition, the tactile presentation device includes a display panel 36 such as a liquid crystal display panel or an electroluminescence (EL) display panel that displays an image. A display panel driving unit 35 driving the display panel 36 to display an image is connected to the display panel 36. The display panel driving unit 35 is connected to the arithmetic operation unit 31. The display panel driving unit 35 receives an input of image data from the arithmetic operation unit 31 and displays an image on the display panel 36 based on the image data.

In addition, the tactile presentation device includes a tactile panel 1 used for detecting a contact position on the contact face 11 together with presenting a tactile sense. The tactile panel 1 overlaps with the display panel 36. A tactile panel driving unit 2 that drives the tactile panel 1 is connected to the tactile panel 1. The tactile panel driving unit 2 is connected to the arithmetic operation unit 31.

Figure 3:
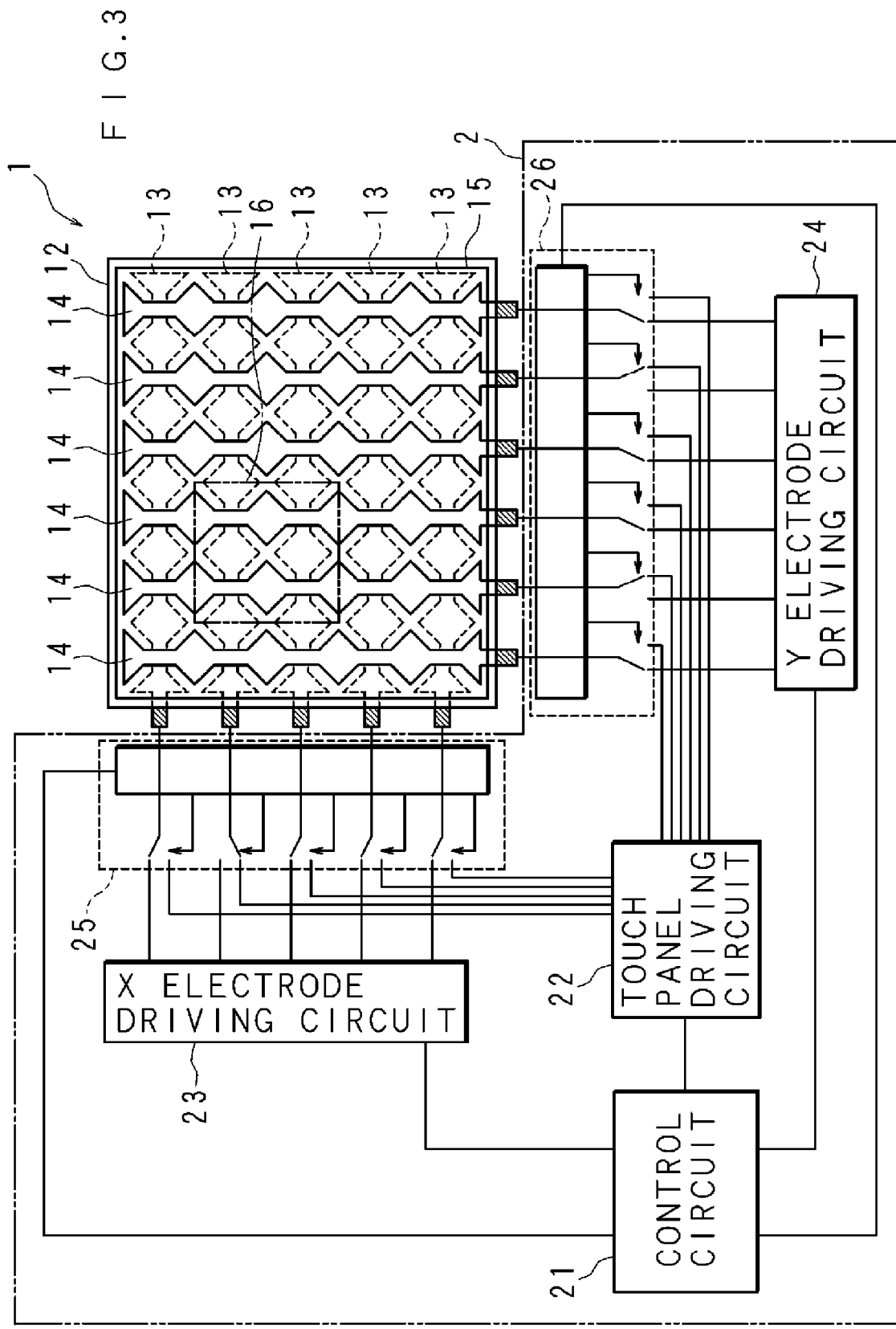
FIG. 3 is a block diagram that illustrates the internal configurations of a tactile panel and a tactile panel driving unit according to Embodiment 1.

FIG. 3 is a block diagram that illustrates the internal configurations of a tactile panel 1 and a tactile panel driving unit 2 according to Embodiment 1. The tactile panel 1 includes a transparent substrate 12 such as a glass substrate. On the substrate 12, a plurality of linear X electrodes (first linear electrodes) 13 are arranged in parallel. In FIG. 3, the X electrodes 13 are denoted using broken lines. In addition, on the substrate 12, a plurality of linear Y electrodes (second linear electrodes) 14 are arranged in parallel. The plurality of X electrodes 13 and the plurality of Y electrodes 14 are insulated from each other. In addition, the plurality of X electrodes 13 and the plurality of Y electrodes 14 intersect each other. Here, a direction along the linear X electrodes 13 will be set as an X direction, and a direction along the linear Y electrodes 14 will be set as a Y direction. A cover layer 15 having an insulating property is superimposed on the substrate 12 with the X electrodes 13 and the Y electrodes 14 interposed therebetween. The surface of the cover layer 15 is the contact face 11.

The tactile panel driving unit 2 includes a touch panel driving circuit (first control unit) 22 for controlling the operations of the X electrodes 13 and the Y electrodes 14 used for detecting contact of an object on the contact face 11. The touch panel driving circuit 22 is a circuit that is used for realizing the function of a touch panel detecting contact of an object on the contact face 11 by using the X electrodes 13 and the Y electrodes 14. The tactile panel driving unit 2 includes an X electrode driving circuit 23 used for controlling the operations of the X electrodes 13 for presenting a tactile sense on the contact face 11 and a Y electrode driving circuit 24 used for controlling the operations of the Y electrodes 14 for presenting a tactile sense on the contact face 11. The X electrode driving circuit 23 and the Y electrode driving circuit 24 are circuits used for presenting a tactile sense on the contact face 11 by using the X electrodes 13 and the Y electrodes 14 and correspond to a second control unit. The tactile panel driving unit 2 includes a first switching unit 25 that is connected to the plurality of the X electrodes 13 and a second switching unit 26 that is connected to the plurality of the Y electrodes 14. The first switching unit 25 is configured to connect some X electrodes 13 to the touch panel driving circuit 22 and connect the other X electrodes 13 to the X electrode driving circuit 23 and to be able to switch the connection of each X electrode 13 to one side to the other side. The second switching unit 26 is configured to connect some Y electrodes 14 to the touch panel driving circuit 22 and connect the other Y electrodes 14 to the Y electrode driving circuit 24 and to be able to switch the connection of each Y electrode 14 to one side to the other side.

Furthermore, the tactile panel driving unit 2 includes a control circuit 21. The control circuit 21 is connected to the touch panel driving circuit 22, the X electrode driving circuit 23, the Y electrode driving circuit 24, the first switching unit 25, and the second switching unit 26. In addition, the control circuit 21 is connected to the arithmetic operation unit 31. The control circuit 21 receives an input of a control signal from the arithmetic operation unit 31 and controls the operations of the touch panel driving circuit 22, the X electrode driving circuit 23, the Y electrode driving circuit 24, the first switching unit 25, and the second switching unit 26. The control circuit 21, the first switching unit 25, and the second switching unit 26 correspond to a third control unit.

Figure 4:
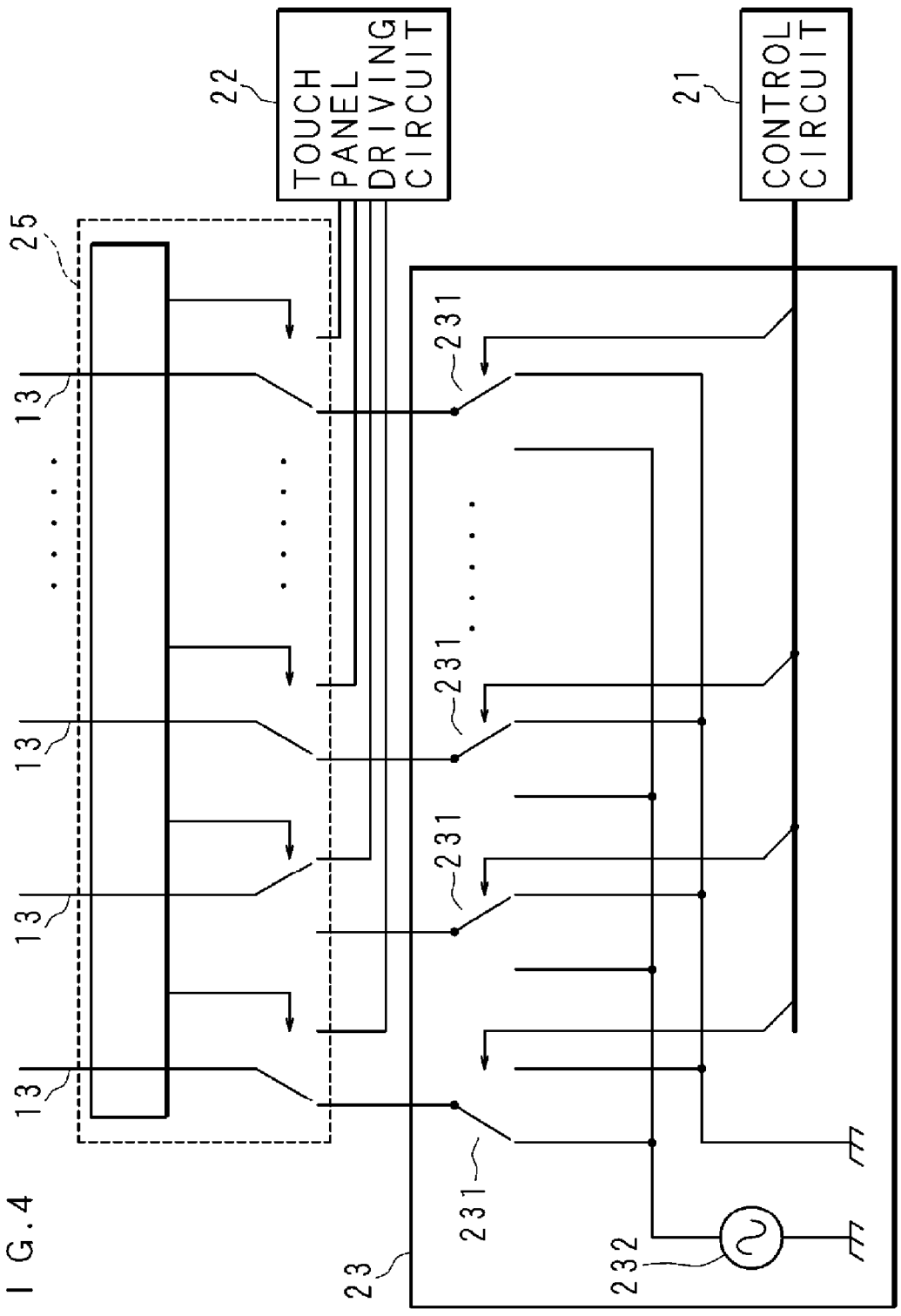
FIG. 4 is a schematic circuit diagram that illustrates the internal configuration of an X electrode driving circuit according to Embodiment 1.

FIG. 4 is a schematic circuit diagram that illustrates the internal configuration of the X electrode driving circuit 23 according to Embodiment 1. The X electrode driving circuit 23 includes a plurality of single-pole double-throw switches 231 and a first AC voltage source 232 that generates an AC voltage having a predetermined first frequency f1. The internal circuit of the X electrode driving circuit 23 is configured to connect each X electrode 13 connected through the first switching unit 25 to one of the first AC voltage source 232 and the ground by using each single-pole double-throw switch 231. Each single-pole double-throw switch 231 is controlled by the control circuit 21 and performs switching of a connection between each X electrode 13 and the first AC voltage source 232 or the ground. The internal circuit of the X electrode driving circuit 23 illustrated in FIG. 4 corresponds to a first signal applying circuit.

Figure 5:
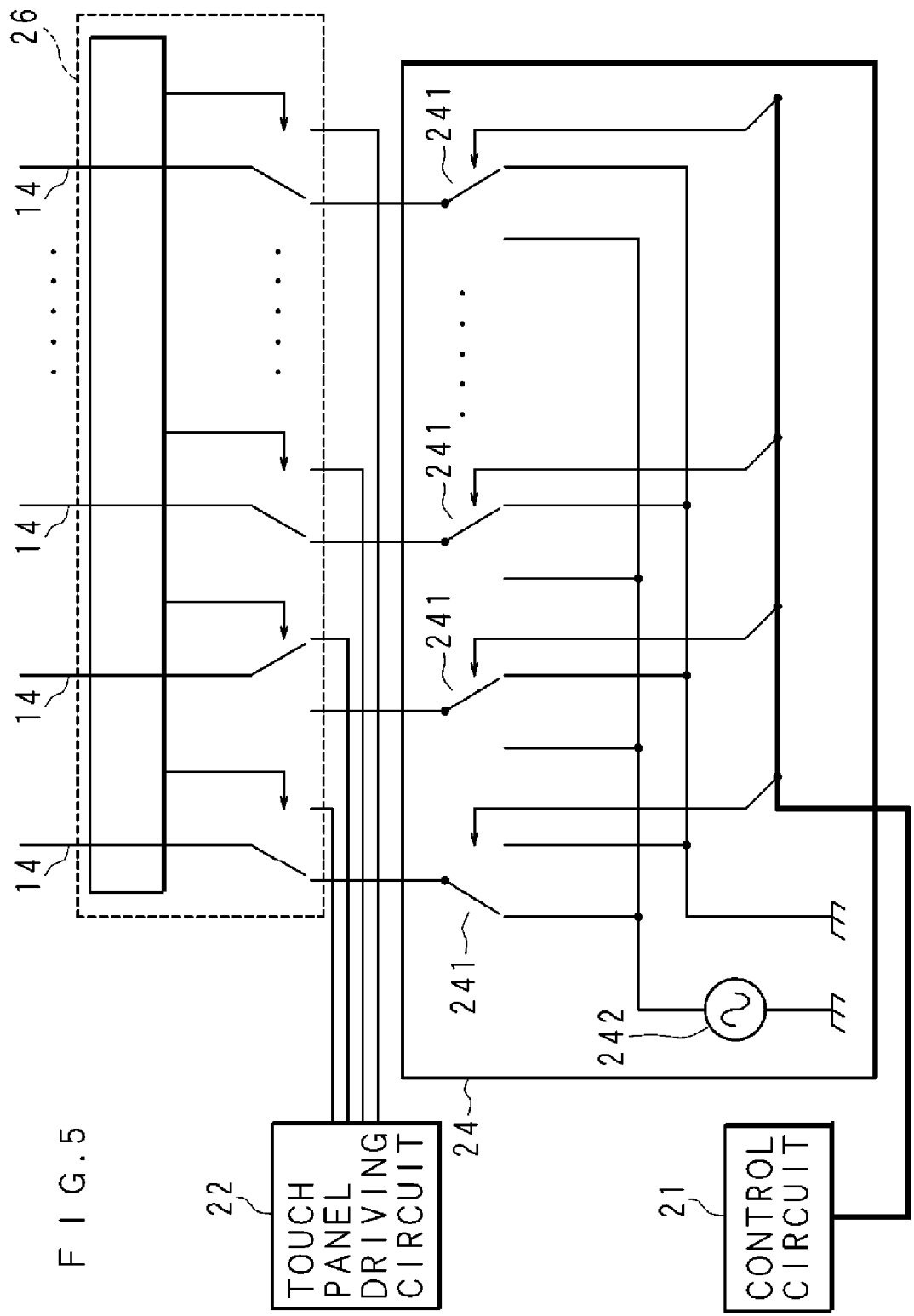
FIG. 5 is a schematic circuit diagram that illustrates the internal configuration of a Y electrode driving circuit according to Embodiment 1.

FIG. 5 is a schematic circuit diagram that illustrates the internal configuration of the Y electrode driving circuit 24 according to Embodiment 1. The Y electrode driving circuit 24 includes a plurality of single-pole double-throw switches 241 and a second AC voltage source 242 that generates an AC voltage having a predetermined second frequency f2. The internal circuit of the Y electrode driving circuit 24 is configured to connect each Y electrode 14 connected through the second switching unit 26 to one of the second AC voltage source 242 and the ground by using each single-pole double-throw switch 241. Each single-pole double-throw switch 241 is controlled by the control circuit 21 and performs switching of a connection between each Y electrode 14 and the second AC voltage source 242 or the ground. The internal circuit of the Y electrode driving circuit 24 illustrated in FIG. 5 corresponds to a second signal applying circuit.

The tactile presentation device presents a tactile sense to the contact face 11 by using the operations of the X electrode driving circuit 23 and the Y electrode driving circuit 24. In a case where a user brings his finger into contact with the contact face 11, this finger is equivalent to an electrode that faces the X electrode 13 or the Y electrode 14 with an insulating body interposed therebetween and is connected to the ground through predetermined impedance. In a case where a voltage is applied to the X electrode 13 or the Y electrode 14, an attracting force (electrostatic force) according to static electricity is generated between the X electrode 13 or the Y electrode 14 and the finger. In a case where an AC voltage is applied, the electrostatic force is periodically changed. As the electrostatic force is changed, a frictional force between the contact face 11 and the finger is periodically changed. When, the user traces the contact face 11 using his finger, a frictional force felt by the finger is periodically changed, and the user perceives a tactile sense. According to a conventional research, it has been disclosed that a tactile sense is perceived in a case where the frequency of an AC voltage is higher than 5 Hz and lower than 500 Hz, and a tactile sense is not perceived in a case where the frequency is not within this range.

In a case where an AC voltage having the first frequency f1 is applied to the X electrode 13, and an AC voltage having the second frequency f2 is applied to the Y electrode 14, the electrostatic force is changed at the first frequency f1 and the second frequency f2. In addition, a beat in which an electrostatic force is changed at the frequency of a difference between the first frequency f1 and the second frequency f2 is generated. According to a conventional research, it has been disclosed that a tactile sense according to a beat is perceived in a case where the frequency of the beat is higher than 10 Hz and lower than 1000 Hz, and a tactile sense according to a beat is not perceived in a case where the frequency of the beat is not within this range.

In this embodiment, the first frequency f1 and the second frequency f2 are set such that both the first frequency f1 and the second frequency f2 are 500 Hz or higher, and the absolute value of a difference between the first frequency f1 and the second frequency f2 is more than 10 Hz and less than 1000 Hz. For example, the first frequency f1=1000 Hz, and the second frequency f2=1240 Hz. The X electrode driving circuit 23 connects some X electrodes 13 among the X electrodes 13 connected to the X electrode driving circuit 23 to the first AC voltage source 232 and connects the other X electrodes 13 to the ground under the control of the control circuit 21. The Y electrode driving circuit 24 connects some Y electrodes 14 among the Y electrodes 14 connected to the Y electrode driving circuit 24 to the second AC voltage source 242 and connects the other Y electrodes 14 to the ground under the control of the control circuit 21. For example, the tactile panel 1 includes five X electrodes $X_0$ to $X_4$ and six Y electrodes $Y_0$ to $Y_5$, the X electrode $X_1$ is connected to the first AC voltage source 232, the Y electrode $Y_1$ is connected to the second AC voltage source 242, and the X electrodes $X_0$ and $X_2$ to $X_4$ and the Y electrodes $Y_0$ and $Y_2$ to $Y_5$ are connected to the ground. In this case, at a portion of the contact face 11 at which the X electrode $X_1$ and the Y electrode $Y_1$ intersect with each other, a beat of 240 Hz is generated, and a user can perceive a tactile sense using his finger. At portions at which the X electrode $X_1$ and the Y electrodes $Y_0$ and $Y_2$ to $Y_5$ intersect with each other, while an electrostatic force is changed at the frequency of 1000 Hz, a tactile sense is not perceived. At portions at which the Y electrode $Y_1$ and the X electrodes $X_0$ and $X_2$ to $X_4$ intersect with each other, while an electrostatic force is changed at the frequency of 1240 Hz, a tactile sense is not perceived. At the other portions, an electrostatic force is not changed, and a tactile sense is not perceived. In this way, the tactile presentation device can present a tactile sense at an arbitrary position on the contact face 11. In addition, a form in which the X electrode driving circuit 23 and the Y electrode driving circuit 24 connect the X electrodes 13 and the Y electrodes 14 not to the ground but to a predetermined DC power source may be employed.

Figure 6:
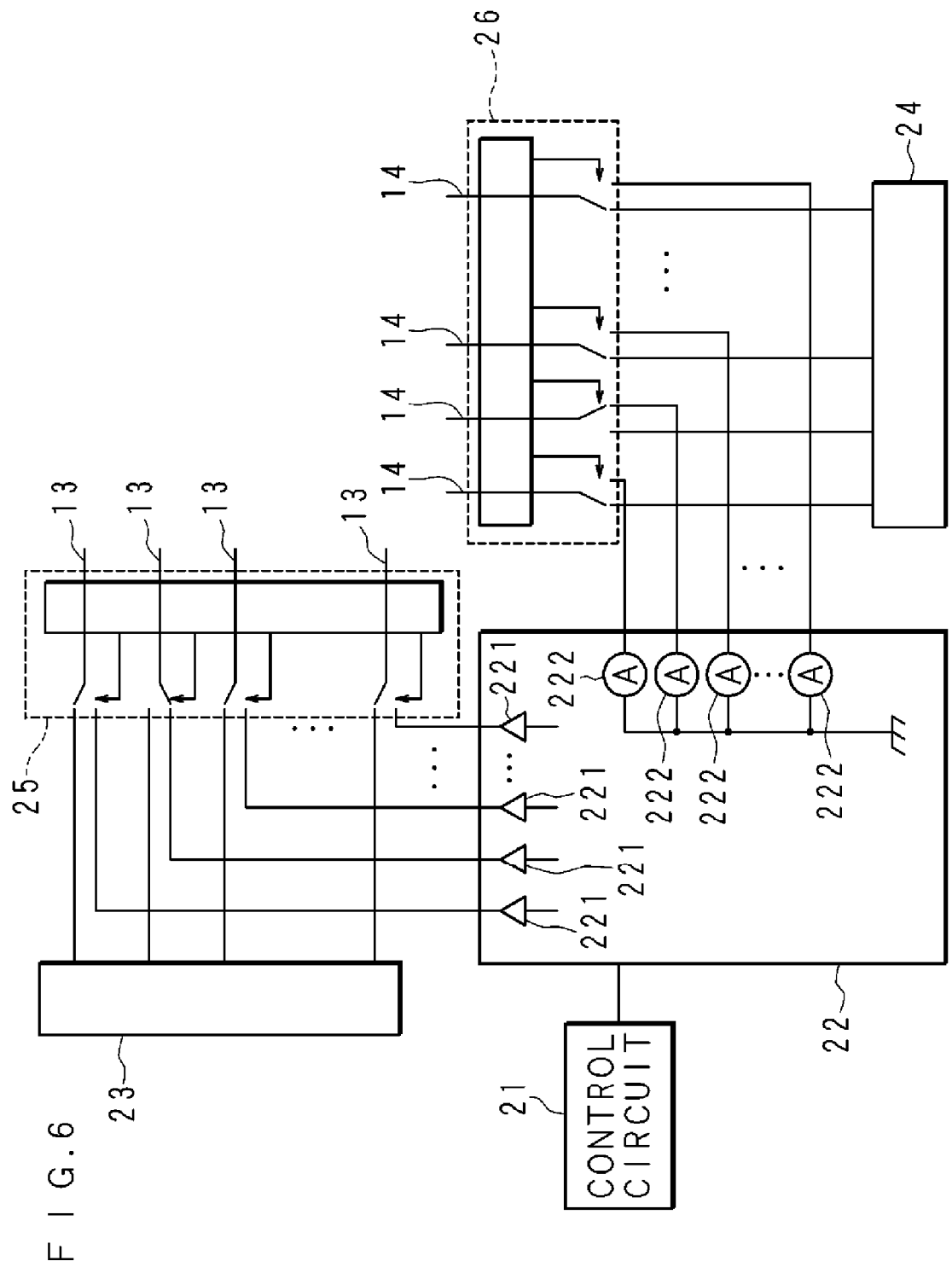
FIG. 6 is a schematic circuit diagram that illustrates the internal configuration of a touch panel driving circuit according to Embodiment 1.

FIG. 6 is a schematic circuit diagram that illustrates the internal configuration of the touch panel driving circuit 22 according to Embodiment 1. The touch panel driving circuit 22 includes a plurality of signal input units 221 and a plurality of current detecting units 222. Each of the signal input units 221 is connected to a signal line connected to the first switching unit 25. Each of the current detecting units 222 is connected to a signal line connected to the second switching unit 26. The signal input units 221 are connected to the X electrodes 13 through the first switching unit 25, and the current detecting units 222 are connected to the Y electrodes 14 through the second switching unit 26. The signal input unit 221 inputs an AC signal to a corresponding X electrode 13. The current detecting unit 222 detects a current signal flowing through a corresponding Y electrode 14. The internal circuit of the touch panel driving circuit 22 illustrated in FIG. 6 corresponds to a detection circuit.

At each portion at which the X electrode 13 and the Y electrode 14 intersect with each other, electrostatic capacitance is generated between the X electrode 13 and the Y electrode 14. In a case where the signal input unit 221 inputs an AC signal to the X electrode 13, an AC current flows between the X electrode 13 and the Y electrode 14 to which the current detecting unit 222 is connected, and the current detecting unit 222 detects the AC current. On the contact face 11, in a case where a user's finger is brought into contact with a portion facing a portion at which the X electrode 13 and the Y electrode 14 intersect with each other, electrostatic capacitance is generated between the X electrode 13 or the Y electrode 14 and the finger, and the electrostatic capacitance between the X electrode 13 and the Y electrode 14 changes. In a case where the electrostatic capacitance between the X electrode 13 and the Y electrode 14 changes, an AC current detected by the current detecting unit 222 changes. The operations of the first switching unit 25 and the second switching unit 26 are controlled by the control circuit 21, and the X electrode 13 and the Y electrode 14 connected to the touch panel driving circuit 22 are specified under the control of the control circuit 21. The control circuit 21 compares an AC current detected by the current detecting unit 222 with a predetermined threshold, thereby detecting a change in the electrostatic capacitance between the X electrode 13 and the Y electrode 14 connected to the touch panel driving circuit 22. In addition, the control circuit 21 detects the position with which the user's finger is brought into contact by specifying the X electrode 13 and the Y electrode 14 connected to the touch panel driving circuit 22 in a case where the electrostatic capacitance changes. The contact position on the contact face 11 is a position facing a portion at which the X electrode 13 and the Y electrode 14 connected to the touch panel driving circuit 22 intersecting with each other. The control circuit 21 outputs data representing the contact position to the arithmetic operation unit 31. In this way, the tactile presentation device detects a contact position on the contact face 11 by using a mutual capacitance system.

In addition, the tactile presentation device may employ a form in which not only a contact position on the contact face 11 is detected, but also a position at which an object approaches is detected in a case where the conductive object such as a finger approaches the contact face 11 within a predetermined distance. In such a form, in a case where an object approaches the contact face 11 within a predetermined distance, electrostatic capacitance is generated between the X electrode 13 and the object, and, similarly, a position approached by the object on the contact face 11 is detected. In addition, the touch panel driving circuit 22 may employ a form in which the current detecting unit 222 is connected to the X electrode 13, and the signal input unit 221 is connected to the Y electrode 14.

Next, a process enabling both the detection of a contact position and the presentation of a tactile sense that is performed by the tactile presentation device will be described. The control circuit 21 performs control of the first switching unit 25 to connect each X electrode 13 to either the touch panel driving circuit 22 or the X electrode driving circuit 23. Similarly, the control circuit 21 performs control of the second switching unit 26 to connect each Y electrode 14 to the touch panel driving circuit 22 or the Y electrode driving circuit 24.

The control circuit 21 causes the first switching unit 25 to connect some X electrodes 13 to the touch panel driving circuit 22 and connects the other X electrodes 13 to the X electrode driving circuit 23. In addition, the control circuit 21 causes the first switching unit 25 to sequentially change the X electrodes 13 to be connected to the touch panel driving circuit 22. When the X electrode 13 connected to the touch panel driving circuit 22 is changed, the first switching unit 25 connects the X electrode 13 that has been connected to the touch panel driving circuit 22 until now to the X electrode driving circuit 23 and connects some X electrodes 13 among a plurality of X electrodes 13 that have been connected to the X electrode driving circuit 23 until now to the touch panel driving circuit 22. For example, a state in which, among the X electrodes $X_0$ to $X_4$, the X electrode $X_0$ is connected to the touch panel driving circuit 22, and the X electrodes $X_1$ to $X_4$ are connected to the X electrode driving circuit 23 is changed to a state in which the X electrode $X_1$ is connected to the touch panel driving circuit 22, and the X electrodes $X_0$ and $X_2$ to $X_4$ are connected to the X electrode driving circuit 23. Then, similarly, the X electrode 13 connected to the touch panel driving circuit 22 is sequentially changed.

Similarly, the control circuit 21 causes the second switching unit 26 to connect some Y electrodes 14 to the touch panel driving circuit 22 and connects the other Y electrodes 14 to the Y electrode driving circuit 24 and sequentially changes the Y electrode 14 to be connected to the touch panel driving circuit 22. When the Y electrode 14 connected to the touch panel driving circuit 22 is changed, the second switching unit 26 connects the Y electrode 14 that has been connected to the touch panel driving circuit 22 until now to the Y electrode driving circuit 24 and connects some Y electrodes 14 among a plurality of Y electrodes 14 that have been connected to the Y electrode driving circuit 24 until now to the touch panel driving circuit 22. For example, a state in which, among the Y electrodes $Y_0$ to $Y_5$, the Y electrode $Y_0$ is connected to the touch panel driving circuit 22, and the Y electrodes $Y_1$ to $Y_5$ are connected to the Y electrode driving circuit 24 is changed to a state in which the Y electrode $Y_1$ is connected to the touch panel driving circuit 22, and the Y electrodes $Y_0$ and $Y_2$ to $Y_5$ are connected to the Y electrode driving circuit 24. Then, similarly, the Y electrode 14 connected to the touch panel driving circuit 22 is sequentially changed.

In addition, the control circuit 21, by controlling the single-pole double-throw switches 231 of the X electrode driving circuit 23, connects the X electrode 13 corresponding to an area to which a tactile sense is to be presented to the first AC voltage source 232 and connects the other X electrodes 13 to the ground. Similarly, the control circuit 21, by controlling the single-pole double-throw switches 241 of the Y electrode driving circuit 24, connects the Y electrode 14 corresponding to an area to which a tactile sense is to be presented to the second AC voltage source 242 and connects the other Y electrodes 14 to the ground. For example, it is assumed that an area surrounded by two-dot chain lines illustrated in FIG. 3 is a target area 16 to which a tactile sense is to be presented on the contact face 11, and the target area 16 is a portion facing intersections of the X electrodes $X_1$ and $X_2$ and the Y electrodes $Y_1$ and $Y_2$. In such a case, the X electrode driving circuit 23 connects the X electrodes $X_1$ and $X_2$ to the first AC voltage source 232 and connects the other X electrodes 13 to the ground, and the Y electrode driving circuit 24 connects the Y electrodes $Y_1$ and $Y_2$ to the second AC voltage source 242 and connects the other Y electrodes 14 to the ground.

Figure 7:
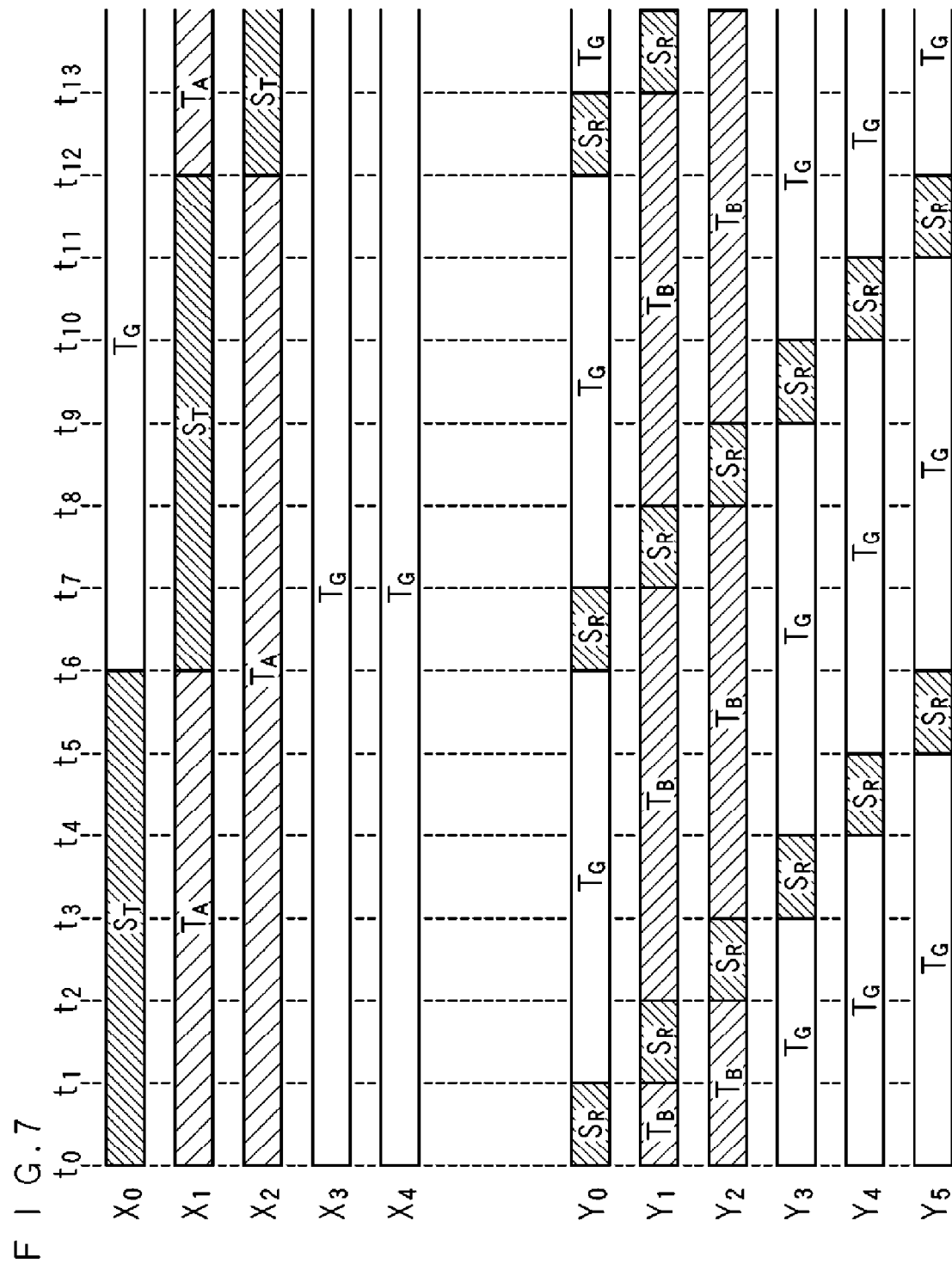
FIG. 7 is a timing diagram that illustrates an example of the operation of each electrode according to Embodiment 1.

FIG. 7 is a timing diagram that illustrates an example of the operation of each electrode according to Embodiment 1. In FIG. 7, the left side to the right side represent the elapse of time, and to to tis represent respective time points. FIG. 7 illustrates the states of the X electrodes $X_0$ to $X_4$ and the Y electrodes $Y_0$ to $Y_5$ at each time point. A state in which the X electrode 13 or the Y electrode 14 is connected to the ground is denoted by $T_G$, a state in which the X electrode 13 is connected to the first AC voltage source 232 is denoted by TA, and a state in which the Y electrode 14 is connected to the second AC voltage source 242 is denoted by TB. In addition, a state in which the X electrode 13 is connected to the touch panel driving circuit 22 is denoted by $S_T$, and a state in which the Y electrode 14 is connected to the touch panel driving circuit 22 is denoted by $S_R$.

As illustrated in FIG. 7, in a period of $t_0$ to $t_6$, the X electrode $X_0$ is connected to the touch panel driving circuit 22. In addition, in a period of $t_0$ to $t_1$, the Y electrode $Y_0$ is connected to the touch panel driving circuit 22, and, in a period of $t_1$ to $t_2$, the Y electrode $Y_1$ is connected to the touch panel driving circuit 22, and the like. Thus, each of the Y electrodes $Y_0$ to $Y_5$ is sequentially connected to the touch panel driving circuit 22. Accordingly, in the period of $t_0$ to $t_6$, detection of contact at positions on the contact face 11 corresponding to intersections between the X electrode $X_0$ and the Y electrodes $Y_0$ to $Y_5$ is sequentially performed. Similarly, in a period of $t_6$ to $t_{12}$, the X electrode $X_1$ is connected to the touch panel driving circuit 22, each of the Y electrodes $Y_0$ to $Y_5$ is sequentially connected to the touch panel driving circuit 22, and detection of contact at positions on the contact face 11 corresponding to intersections between the X electrode $X_1$ and the Y electrodes $Y_0$ to $Y_5$ is sequentially performed. The process is similarly repeated with the X electrode 13 connected to the touch panel driving circuit 22 changed, and the detection of contact at positions on the contact face 11 is sequentially performed. In this way, each of the X electrodes 13 and each of the Y electrodes 14 are sequentially connected to the touch panel driving circuit 22, thereby being sequentially controlled for detection of contact on the contact face 11. In other words, the contact face 11 is scanned for detection of a contact position. After the completion of the scanning of the whole contact face 11, the control circuit 21 repeats the process of sequentially connecting each X electrode 13 and each Y electrode 14 to the touch panel driving circuit 22. In this way, the scanning is repeated, and, in a case where a user contacts an arbitrary position on the contact face 11, the contact point is detected. The scanning of the whole contact face 11 is repeated 10 to 1000 times per one second. For example, the scanning of the whole contact face 11 is repeated 60 times per one second.

As illustrated in FIG. 7, in a period other than the period in which the electrode is connected to the touch panel driving circuit 22, the X electrodes $X_1$ and $X_2$ are connected to the first AC voltage source 232, and the Y electrodes $Y_1$ and $Y_2$ are connected to the second AC voltage source 242, and the other X electrode 13 and the other Y electrodes 14 are connected to the ground. As a result, a tactile sense is presented to the target area 16 within the contact face 11. In this way, the X electrodes 13 and the Y electrodes 14 are controlled for presenting a tactile sense to the contact face 11. As a result of the control of the X electrodes 13 and the Y electrodes 14 as described above, a part of the contact face 11 is used for detecting contact, and the other portion is used for presenting a tactile sense, and the position of the portion used for detecting contact is sequentially changed. Each portion on the contact face 11 is used for detecting contact at a specific timing and is used for presenting a tactile sense at the other timings.

As above, in this embodiment, also in a period in which some X electrodes 13 and some Y electrodes 14 are controlled for detecting contact on the contact face 11, the other X electrodes 13 and Y electrodes 14 are controlled for presenting a tactile sense to the contact face 11. For this reason, the tactile presentation device can simultaneously perform the presentation of a tactile sense and the detection of a contact position, and a tactile sense felt by a user during the use of the tactile presentation device is not interrupted. In addition, the X electrode 13 and the Y electrode 14 controlled for detecting contact on the contact face 11 are sequentially changed, and each of the X electrode 13 and the Y electrode 14 is controlled for presenting a tactile sense to the contact face 11 at timings other than the timing at which the electrodes are controlled for detecting contact. For this reason, contact can be detected at any position on the contact face 11, and a tactile sense can be presented to any position. While the presentation of a tactile sense is not performed at a position at which the detection of contact on the contact face 11 is performed, the position at which the contact is detected is sequentially moved, and accordingly, the presentation of a tactile sense is not interrupted on the whole contact face 11.

As illustrated in FIG. 7, the control circuit 21 connects an X electrode 13 adjacent to the X electrode 13 connected to the touch panel driving circuit 22 among the X electrodes 13 to the X electrode driving circuit 23 through the first switching unit 25. Similarly, the control circuit 21 connects a Y electrode 14 adjacent to the Y electrode 14 connected to the touch panel driving circuit 22 among the Y electrodes 14 to the Y electrode driving circuit 24 through the second switching unit 26. In this way, the X electrode 13 that is adjacent to the X electrode 13 controlled for detecting contact on the contact face 11 and the Y electrode 14 adjacent to the Y electrode 14 controlled for detecting contact are controlled for presenting tactile senses. In a case where a plurality of electrodes controlled for detecting contact on the contact face 11 are adjacent to each other, there is a problem in that a portion not used for presenting a tactile sense becomes large. In this embodiment, electrodes adjacent to the electrodes controlled for detecting contact on the contact face 11 are controlled for presenting a tactile sense, and accordingly, the size of a portion not used for presenting a tactile sense on the contact face 11 is minimized.

In this embodiment, a distance between the centers of the X electrodes 13 adjacent to each other and a distance between the centers of the Y electrodes 14 adjacent to each other are configured to be sufficiently smaller than an area in which a person's finger is brought into contact with the contact face 11. For this reason, the size of a portion not used for presenting a tactile sense to the contact face 11 is sufficiently smaller than the size of a user's finger. In a portion in which a user's finger is brought into contact with the contact face 11, even in a case where a part does not present a tactile sense, a tactile sense is presented to the other part, and a tactile sense averaged over the whole finger is perceived. Accordingly, a partly interruption of the presentation of a tactile sense for detecting a contact position is not perceived by a user.

Conventionally, it is understood that the time resolution of a human's tactile sense is 10 ms. In this embodiment, a time interval for changing the X electrode 13 controlled for detecting contact on the contact face 11 is set to be shorter than 10 ms. In the example illustrated in FIG. 7, the length of the period of $t_0$ to $t_6$ and the length of the period of $t_6$ to $t_{12}$ is less than 10 ms. For example, the length of a period in which each X electrode 13 is continuously connected to the touch panel driving circuit 22 is 1.6 ms. A time interval for changing the Y electrode 14 controlled for detecting contact on the contact face 11 is shorter. In the example illustrated in FIG. 7, the length of a period in which each Y electrode 14 is continuously connected to the touch panel driving circuit 22 is ⅙ of the length of the period in which each X electrode 13 is continuously connected to the touch panel driving circuit 22. The length of a period in which a tactile sense is not presented in a part of the contact face 11 is sufficiently shorter than the time resolution of the human tactile sense, and accordingly, a user cannot feel any loss of the tactile sense. Accordingly, a partly interruption of the presentation of a tactile sense for detecting a contact position cannot be perceived by a user.

Figure 8:
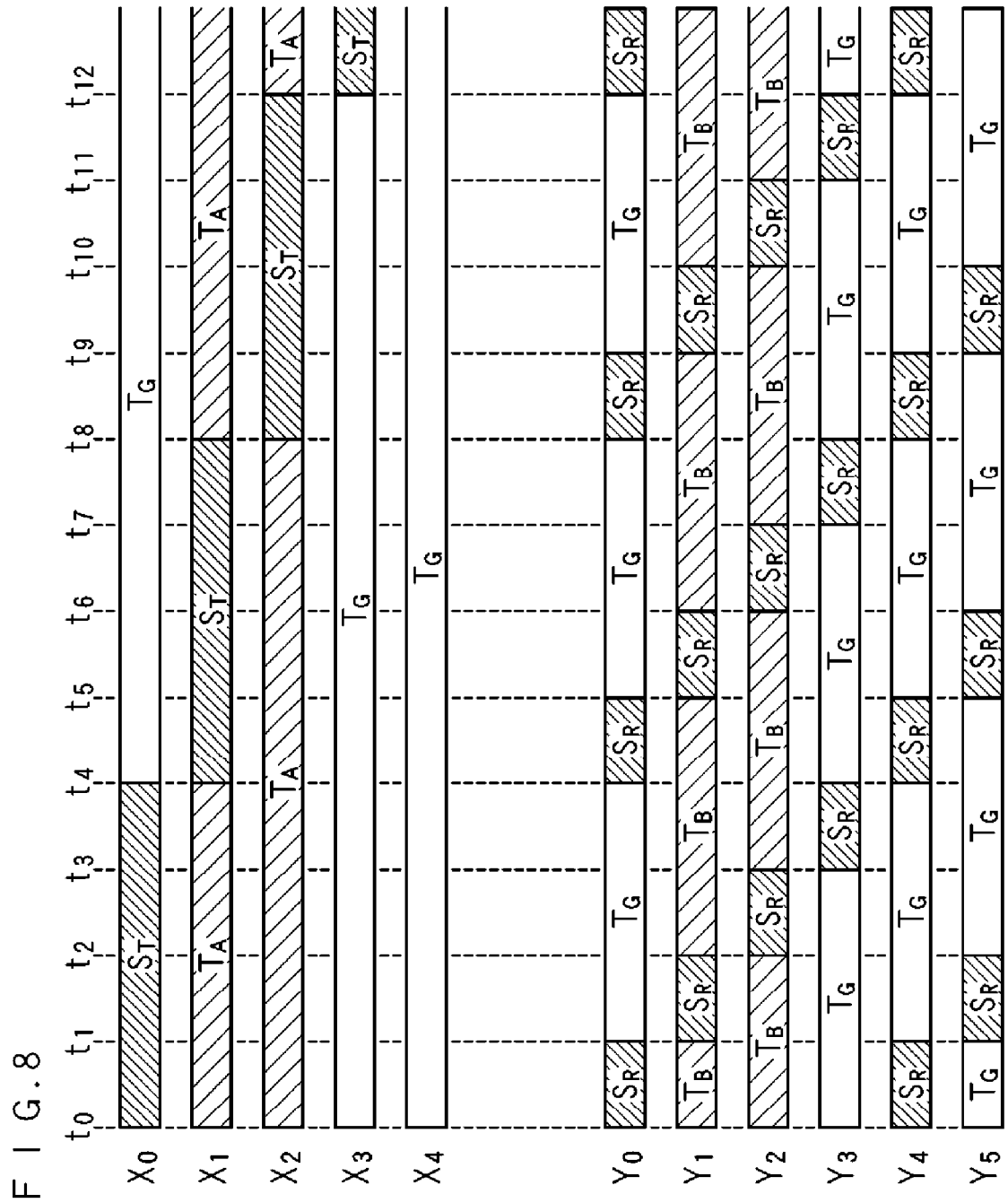
FIG. 8 is a timing diagram that illustrates another example of the operation of each electrode according to Embodiment 1.

FIG. 8 is a timing diagram that illustrates another example of the operation of each electrode according to Embodiment 1. As illustrated in FIG. 8, the tactile presentation device may have a form in which a plurality of Y electrodes 14 are simultaneously connected to the touch panel driving circuit 22. In this case, the control circuit 21 causes the second switching unit 26 to connect a plurality of Y electrodes 14 not adjacent to each other to the touch panel driving circuit 22. More specifically, in a period of $t_0$ to $t_1$, Y electrodes $Y_0$ and $Y_4$ are connected to the touch panel driving circuit 22, and, in a period of $t_1$ to $t_2$, Y electrodes $Y_1$ and $Y_5$ are connected to the touch panel driving circuit 22. In other words, a plurality of Y electrodes 14 not adjacent to each other are controlled for simultaneously detecting contact on the contact face 11.

By simultaneously controlling the plurality of Y electrodes 14 for detecting contact on the contact face 11, a time required for sequentially controlling all the Y electrodes 14 for detecting contact can be shortened. In accompaniment with this, a time required for controlling each X electrode 13 for detecting contact can be shortened. For this reason, a time required for detecting contact in all the portions of the contact face 11 can be shortened. In addition, the detection of contact is performed simultaneously at a plurality of positions on the contact face 11. Accordingly, the tactile presentation device can quickly detect contact position in a case where a user contacts an arbitrary position on the contact face 11. In addition, since the plurality of Y electrodes 14 controlled for detecting contact are not adjacent to each other, the size of a portion of the contact face 11 that is not used for presenting a tactile sense is minimized. Furthermore, the tactile presentation device may employ a form in which a plurality of X electrodes 13 not adjacent to each other are simultaneously controlled for detecting contact on the contact face 11.

Figure 9:
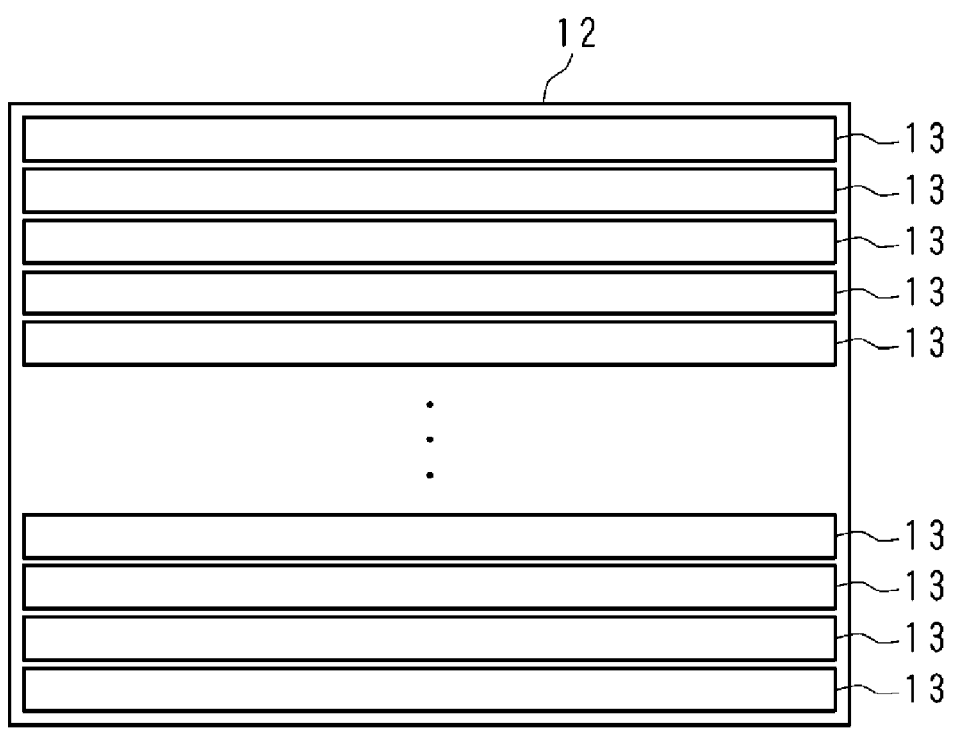
FIG. 9 is a schematic plan view that illustrates a model of a tactile panel for description.

Next, a distance between the centers of the electrodes adjacent to each other and a time interval for changing the electrode controlled for detecting contact on the contact face 11 will be further described. FIG. 9 is a schematic plan view that illustrates a model of the tactile panel 1 for description. A model in which a plurality of X electrodes 13 are arranged on the substrate 12, but no Y electrode 14 is arranged will be considered. The number of the X electrodes 13 is assumed to be 32, and the distance between the centers of the X electrodes 13 adjacent to each other is assumed to be 5 mm. The size of the contact face 11 in the Y direction is 160 mm. A time for scanning all the X electrodes 13 is 16.6 ms. A time required for controlling each X electrode 13 for detecting contact is 0.519 ms. A contact portion where a user's finger touches the contact face 11 is a square of which the length of one side is 10 mm. The moving speed of a finger with contacting on the contact face 11 is 300 mm/s. An AC voltage applied to the X electrode 13 for presenting a tactile sense is a voltage of 150 V with 100 Hz.

Figure 10A:
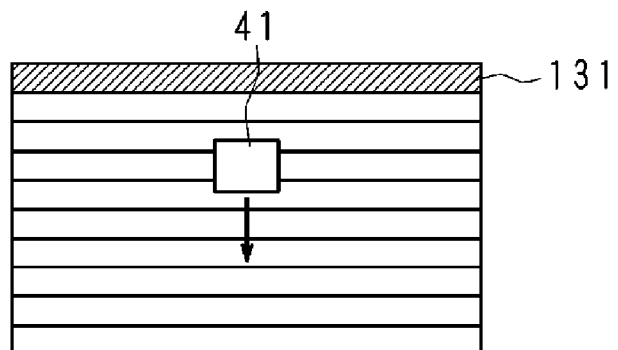
FIGS. 10A to 10D are schematic views that illustrate a positional relation between an X electrode and a contact portion where a user's finger touches a contact face.
Figure 10B:
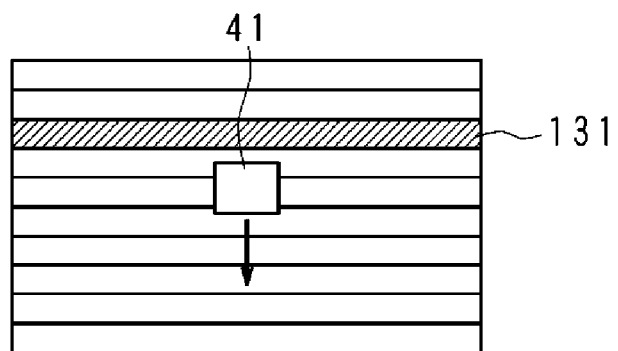
Figure 10C:
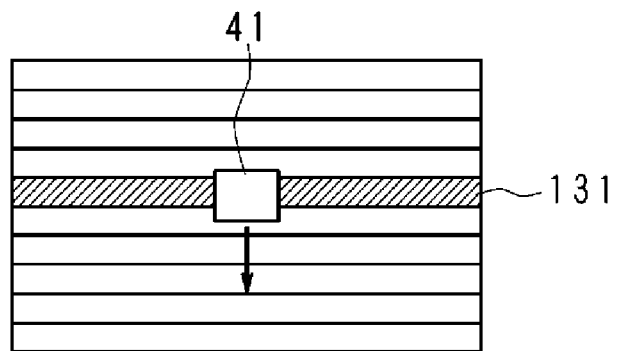
Figure 10D:
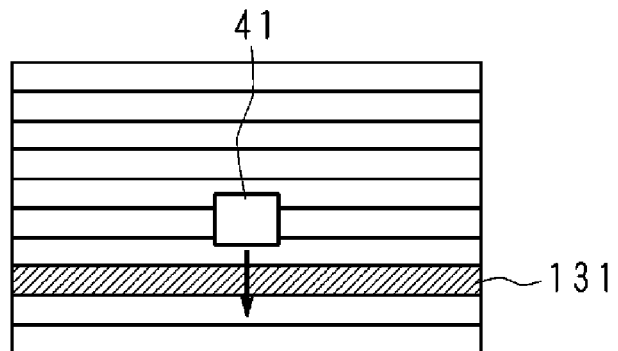

FIGS. 10A to 10D are schematic views that illustrate a positional relation between the X electrode 13 and a contact portion where a user's finger touches the contact face 11. In the figures, a plurality of X electrodes 13 are vertically aligned, and an X electrode 131 illustrated in the figures represents an X electrode 13 controlled for detecting contact. X electrodes 13 other than the X electrode 131 are controlled for presenting a tactile sense. A contact portion 41 where the finger touches the contact face 11 is illustrated in the figures. In the figures, the downward direction is a Y direction. States after predetermined times sequentially elapse from the state illustrated in FIG. 10A are respectively illustrated in FIGS. 10B, 10C, and 10D. In the figures, arrows illustrate directions in which the finger moves. As the user traces the contact face 11 in this direction by using a finger, a frictional force is generated between the finger and the contact face 11, and the user feels a tactile sense according to an electrostatic force. As illustrated in the sequence of FIGS. 10A to 10D, the contact portion 41 where the finger touches the contact face 11 moves according to elapse of time. Similarly, according to scanning, the position of the X electrode 131 controlled for detecting contact among the X electrodes 13 changes. The scanning speed of the X electrode 13 is much higher than the moving speed of the contact portion 41. As illustrated in FIG. 10C, in a case where the X electrode 131 and the contact portion 41 overlap each other in the plan view, contact of the finger is detected, and an electrostatic force operating on the finger for presenting a tactile sense is decreased.

FIG. 11 is a schematic view that illustrates a relation between time and the positions of a contact portion 41 and an X electrode 131. In the drawing, the vertical axis represents time, and the time elapses from the upper side toward the lower side. The horizontal axis represents a position in the Y direction that is a distance from an end. In the drawing, each hatched portion represents that an X electrode 13 located at a position corresponding to the portion at time corresponding to the portion is an X electrode 131 controlled for detecting contact. The other portion represents that the X electrode 13 is controlled for presenting a tactile sense. For example, an X electrode 13 positioned in the first row, in other words, an X electrode 13 located at a position of 0 to 5 mm in the Y direction is controlled for detecting contact in a period of 0 to 0.519 ms and is controlled for presenting a tactile sense in the other period. An X electrode 13 positioned in the second row, in other words, an X electrode 13 located at a position of 5 to 10 mm in the Y direction is controlled for detecting contact in a period of 0.519 to 1.038 ms and is controlled for presenting a tactile sense in the other period. In this way, the X electrode 131 controlled for detecting contact is sequentially changed.

In FIG. 11, the trajectory of the center of the contact portion 41 is illustrated using a solid line, and the trajectories of the upper end and the lower end of the contact portion 41 are illustrated using broken lines. At time 0, the center of the contact portion 41 is located at a position of 17.5 mm. This position coincides with the center of an X electrode 13 positioned in the fourth row in the Y direction. The user slides his finger on the contact face 11 at the speed of 300 mm/s in the Y direction in a direction in which the numerical value of the position of the Y direction increases. At time 5.19 ms, the position of the center of the contact portion 41 is 19.057 mm. As illustrated in FIG. 11, for example, at time 0.77 ms, the X electrodes 13 located at positions facing the range of the upper end to the lower end of the contact portion 41, in other words, the X electrodes 13 corresponding to all the areas of the contact portions 41 are controlled for presenting a tactile sense. At time 1.8 ms, X electrodes 13 corresponding to an area having a half area of the contact portion 41 are controlled for detecting contact, and the other X electrodes 13 are controlled for presenting a tactile sense. At this time, an electrostatic force generated at the finger for presenting a tactile sense becomes a half of a normal case in accordance with this area.

Figure 12:
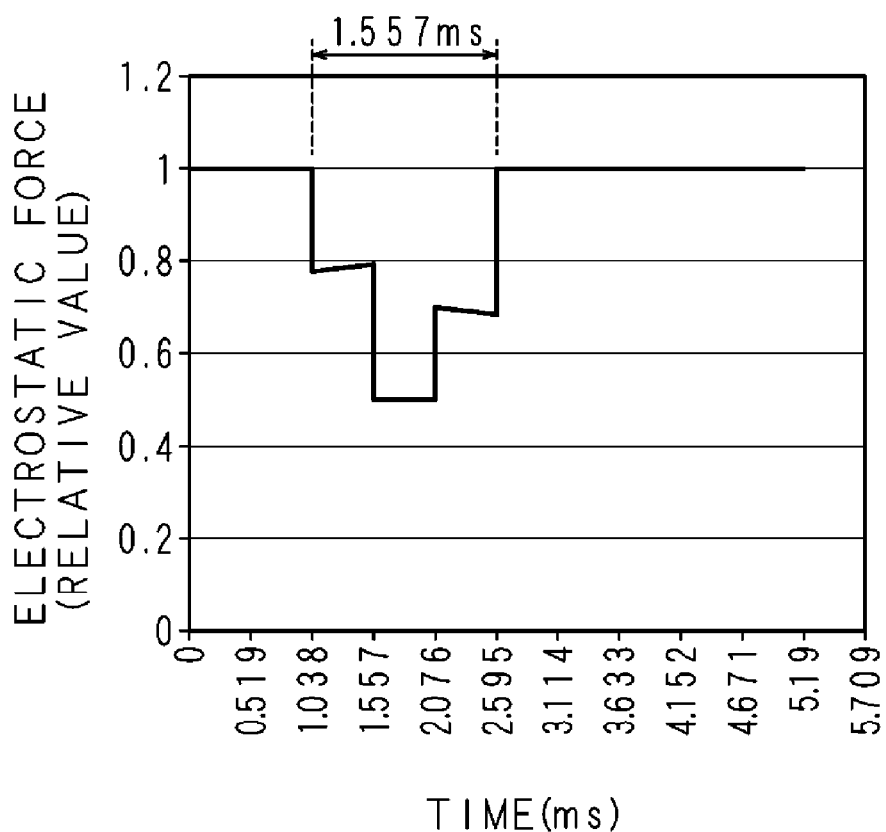
FIG. 12 is a characteristic diagram that illustrates a change in an electrostatic force generated at a finger.

FIG. 12 is a characteristic diagram that illustrates a change in the electrostatic force generated at a finger. The horizontal axis represents time, and the vertical axis represents a relative value of the electrostatic force. In a time period of 0 to 1.038 ms, the relative value of the electrostatic force is "1". After time 1.038 ms, the relative value of the static electric force decreases up to 0.775 and slightly rises up to 0.794 over time 1.557 ms. After time 1.557 ms, the relative value of the static electric force decreases up to 0.5 and is 0.5 until time 2.076 ms. After time 2.076 ms, the relative value of the static electric force rises to 0.6935 and decreases up to 0.678 over time 2.595 ms. After time 2.595 ms, the relative value of the static electric force becomes 1. A period in which a decrease in the electrostatic force occurs is merely 1.557 ms between time 1.038 ms and time 2.595 ms. This period is sufficiently shorter than the time resolution 10 ms of the tactile sense. The minimum value of the relative value of the electrostatic force is 0.5. As a result, an effect that an interruption of the tactile sense is not perceived by the user can be acquired.

In addition, as the reason for user's no perception of an interruption of the tactile sense, another reason may be considered. In the model of the tactile panel 1 illustrated in FIG. 9, the frequency of the AC voltage applied to the X electrode 13 for presenting a tactile sense is 100 Hz, and the frequency of the electrostatic force is 200 Hz, which is twice the frequency of the AC voltage. This frequency mainly stimulates a Pacinian corpuscle among human mechanoreceptors. The receptive field of the Pacinian corpuscle is wide, and an edge is unclearly detected or not detected. For this reason, even in a case where an electrostatic force is not generated in a half area of the contact portion 41, it is perceived by the user that a tactile sense is presented to the whole contact portion 41. Even in a case where a difference between a case where an electrostatic force is generated in the whole contact portion 41 and a case where an electrostatic force is generated only in a half thereof can be perceived, the difference is perceived as a difference in the strength of a stimulus, and a difference between presence/absence of an edge is not perceived. Since an edge that becomes a clue for the perception of a change in the tactile sense cannot be detected, the user cannot perceive a change in the tactile sense, and no interruption of the tactile sense is considered to be perceived. In this way, the use of the electrostatic force of a frequency mainly stimulating a Pacinian corpuscle is considered to be one factor causing the effect of user's no perception of an interruption of the tactile sense.

Based on the viewpoints described above, in this embodiment, a distance between the centers of the X electrodes 13 adjacent to each other and a distance between the centers of the Y electrodes 14 adjacent to each other are 5 mm or less. In the contact portion where the finger touches the contact face 11, a half or more in the X direction and a half or more in the Y direction face X electrodes 13 and Y electrodes 14 controlled for presenting a tactile sense. In addition, in this embodiment, a value acquired by integrating a function of a temporal change in the relative decreased amount of the electrostatic force within the contact portion 41 as illustrated in FIG. 12 with respect to time is configured to be less than 10 ms. Here, the concept of a value acquired by integrating the function of a temporal change in the relative decreased amount of the electrostatic force with respect to time will be supplemented. In FIG. 12, the vertical axis represents the electrostatic force, in other words, a force, and the horizontal axis represents the time. Accordingly, a value acquired by integrating the function of a temporal change in the relative decreased amount of the electrostatic force with respect to time can be regarded as an analogy of an impulse called in dynamics. The magnitude of an interruption of the tactile sense perceived according to a decrease in the electrostatic force is a function of the magnitude of a decrease in the electrostatic force and a time in which the electrostatic force is decreased. The magnitude of the interruption of the tactile sense perceived in a predetermined range is a monotonous increasing function of an impulse that is the product of the magnitude of the decrease in the electrostatic force and the time in which the electrostatic force is decreased. By configuring the value acquired by integrating the function of the temporal change in the relative decreased amount of the electrostatic force with respect to time to be smaller than the time resolution, which is 10 ms, of the human tactile sense, the user's perception of an interruption in the presentation of a tactile sense disappears. In the example illustrated in FIG. 12, a decrease in the electrostatic force occurs within a shorter period than 10 ms, which is the time resolution of a tactile sense, and a perceived electrostatic force is averaged over the whole finger to be non-zero even in the case where the electrostatic force is decreased, and accordingly, an interruption of the presentation of a tactile sense is not perceived by a user. In addition, even in a case where an average value of the electrostatic force over the whole finger is zero, by configuring the time in which the electrostatic force is zero to be shorter than 10 ms, an interruption of the presentation of a tactile sense is not perceived by the user.

Figure 13:
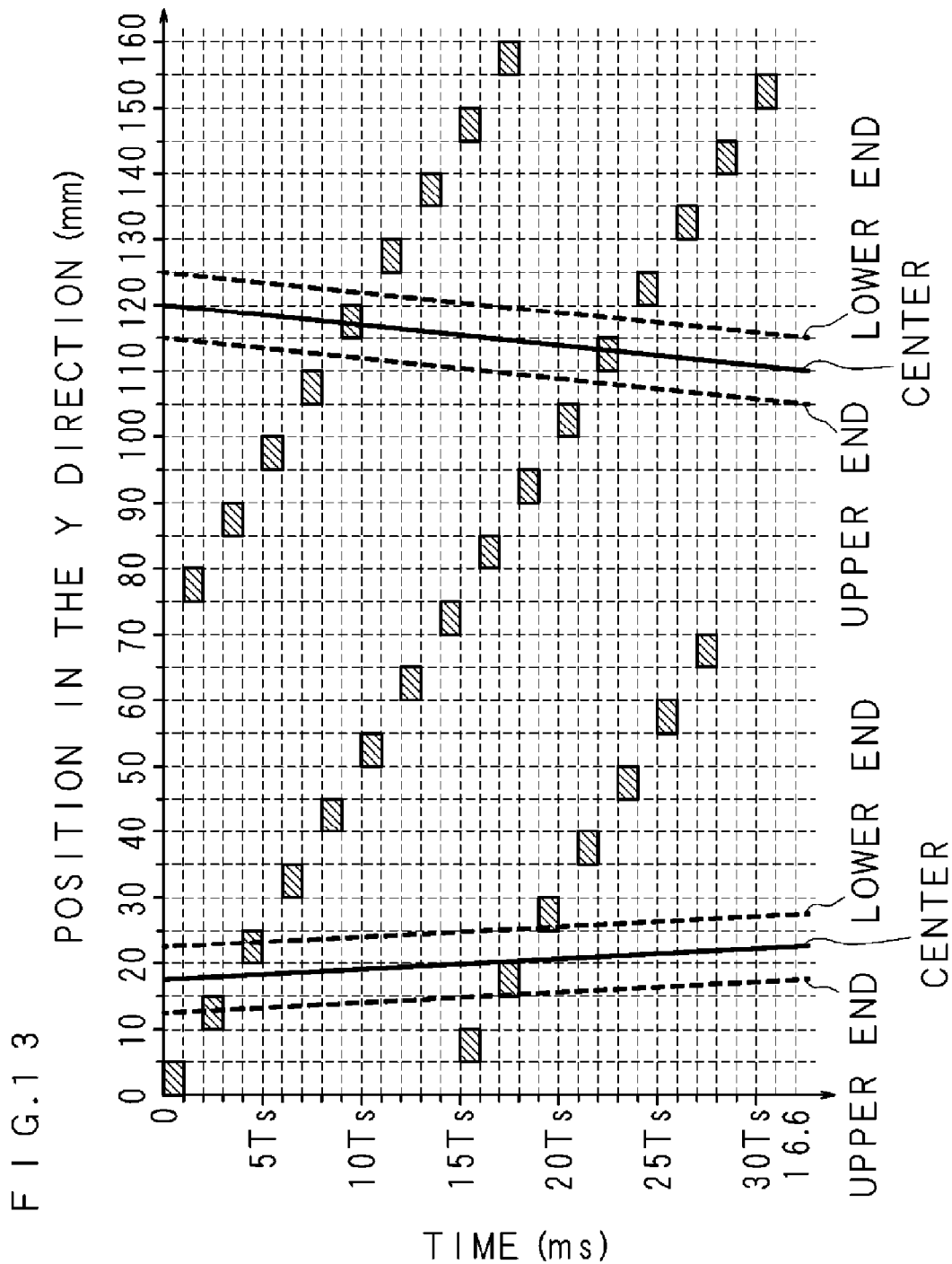
FIG. 13 is a schematic view that illustrates a relation between time and the positions of a contact portion and an X electrode in a case where the position of the X electrode controlled for detecting contact is discretely changed in the model of the tactile panel illustrated in FIG. 9.

In the description of this embodiment presented above, while a form in which an electrode adjacent to an electrode controlled for detecting contact on the contact face 11 is an electrode controlled next for detection of contact has been explained, the tactile presentation device may employ a form in which an electrode not adjacent to an electrode controlled for detection of contact is an electrode controlled next for the detection of contact. FIG. 13 is a schematic view that illustrates a relation between time and the positions of a contact portion 41 and an X electrode 131 in a case where the position of the X electrode 131 controlled for detecting contact is discretely changed in the model of the tactile panel 1 illustrated in FIG. 9. In the drawing, the vertical axis represents time, and the time elapses from the upper side toward the lower side. In the drawing, $T_s$ is $T_s=0.519$ ms. The horizontal axis represents a position in the Y direction that is a distance from an end. In the drawing, each hatched portion represents that an X electrode 13 located at a position corresponding to the portion at time corresponding to the portion is an X electrode 131 controlled for detecting contact. The other portion represents that the X electrode 13 is controlled for presenting a tactile sense.

In the example illustrated in FIG. 13, in a time period of 0 to $T_s$, an X electrode 13 located at a position of 0 to 5 mm in the Y direction, in other words, an X electrode 13 positioned in the first row is controlled for detection of contact. In a time period of $T_s$ to $2T_s$, an X electrode 13 located at a position of 75 to 80 mm in the Y direction, in other words, an X electrode 13 positioned in the 16th row is controlled for detection of contact. Subsequently, in a time period of $2T_s$ to $3T_s$, an X electrode 13 located at a position of 10 to 15 mm in the Y direction, in other words, an X electrode 13 positioned in the 3rd row is controlled for detection of contact. In this way, the position of the X electrode 131 controlled for detection of contact is changed to the 16th row after the first row, and thereafter, is discretely changed to the 3rd row, the 18th row, the 5th row, the 20th row, the 7th row, and the like.

By discretely changing the position of the X electrode 131, timings at which the electrostatic force decreases in a plurality of areas included within the contact portion 41 are discrete. For this reason, the period in which the presentation of the tactile sense is interrupted within the contact portion 41 is further shortened. Accordingly, the effect of user's no perception of an interruption of the tactile sense is further improved.

In FIG. 13, two examples of the trajectories of the contact portion 41 are illustrated. The trajectory of the center of the contact portion 41 is illustrated using a solid line, and the trajectories of the upper end and the lower end of the contact portion 41 are illustrated using broken lines. The trajectories illustrated in a left portion of FIG. 13 are trajectories of a contact portion 41 that is located at the position of 17.5 mm at time 0 and moves at the speed of 300 mm/s in a direction in which the numerical value of the position of the Y direction increases. According to these trajectories, the electrostatic force within the contact portion 41 is 78% of a normal case in a time period of $2T_s$ to $3T_s$ and is 70% in a time period of $4T_s$ to $5T_s$. On the other hand, in a period interposed between both the periods, there is no decrease in the electrostatic force. The length of the period in which a decrease in the electrostatic force occurs is a maximum of $T_s$ and is extremely short. The length of this period is shorter than 1.557 ms illustrated in FIG. 12 and is sufficiently shorter than 10 ms that is the time resolution of the tactile sense. For this reason, an interruption of the tactile sense is not perceived by the user. The trajectories illustrated in a right portion of FIG. 13 are trajectories of a contact portion 41 that is located at the position of 120 mm at time 0 and moves at the speed of 600 mm/s in a direction in which the numerical value of the position of the Y direction decreases. Also in the case of tracing these trajectories, the period in which a decrease in the electrostatic force occurs is a maximum of $T_s$, which is extremely short, and an interruption of the tactile sense is not perceived by the user.

As in the example illustrated in FIG. 13, the tactile presentation device may employ a form in which the positions of the X electrode 13 and the Y electrode 14 controlled for detecting contact on the contact face 11 may be discretely changed among the X electrodes 13 and the Y electrodes 14. By discretely changing the positions of the X electrode 13 and the Y electrode 14 to be controlled for detecting contact, timings at which the electrostatic force decreases in a plurality of areas included within the contact portion 41 where the user's finger touches the contact face 11 are discrete. For this reason, similar to the example illustrated in FIG. 13, the period in which the electrostatic force decreases within the contact portion is further shortened, and accordingly, the effect of user's no perception of an interruption of the tactile sense is further improved.

Embodiment 2

A tactile presentation device according to Embodiment 2 detects a contact position on a contact face 11 by using a method difference from that of Embodiment 1. The configuration of the tactile presentation device is similar to that of the case of Embodiment 1 illustrated in FIGS. 1 to 3 except for the inside of a touch panel driving circuit 22.

Figure 14:
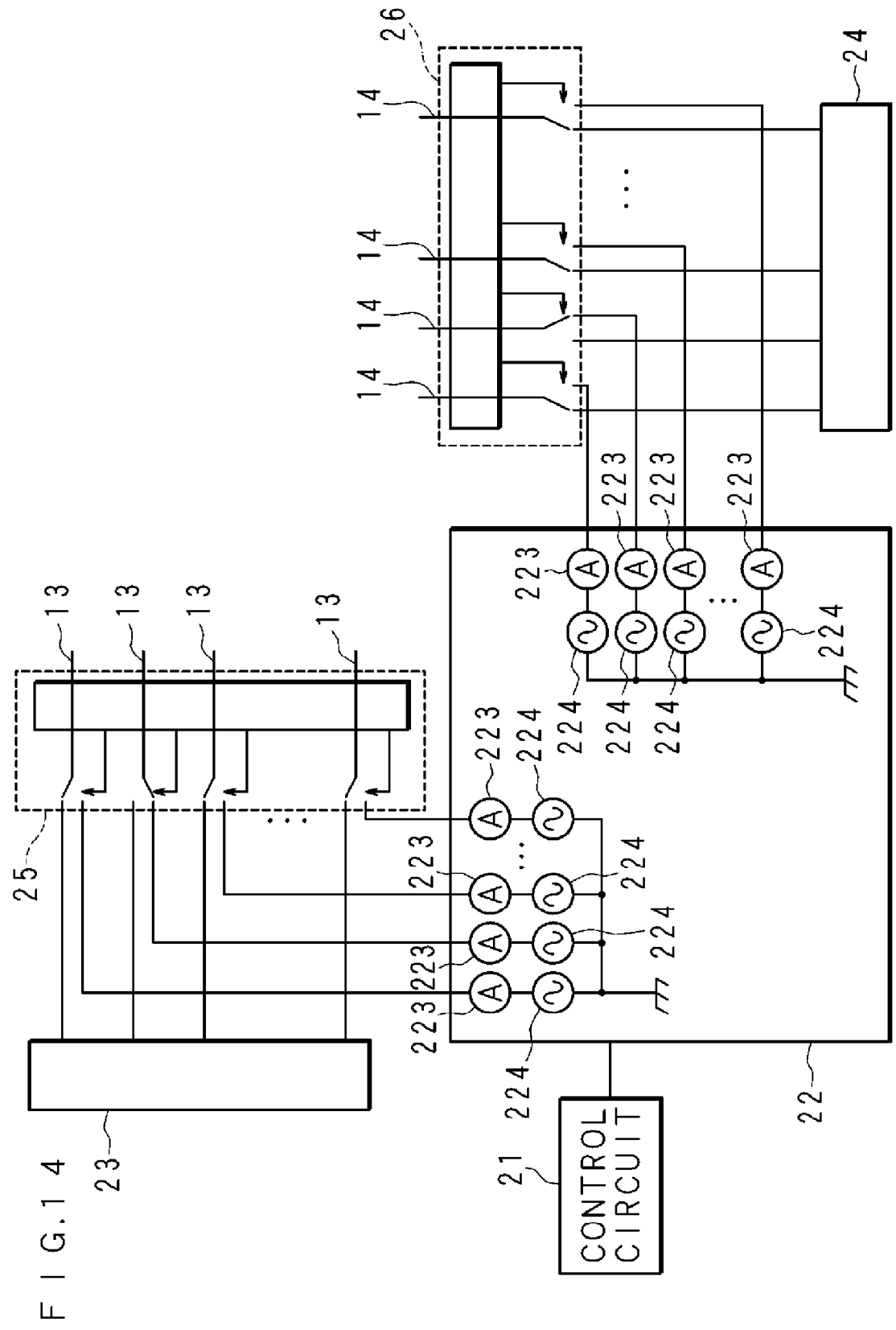
FIG. 14 is a schematic circuit diagram that illustrates the internal configuration of a touch panel driving circuit according to Embodiment 2.

FIG. 14 is a schematic circuit diagram that illustrates the internal configuration of the touch panel driving circuit 22 according to Embodiment 2. The touch panel driving circuit 22 includes a plurality of current detecting units 223 and a plurality of AC voltage sources 224. Each current detecting unit 223 is connected to a signal line connected to a first switching unit 25 and is connected to a signal line connected to a second switching unit 26. The AC voltage source 224 is connected to each current detecting unit 223. The AC voltage sources 224 are connected to the ground. Through the first switching unit 25, the current detecting units 223 are connected to X electrodes 13, the AC voltage sources 224 apply voltages to the X electrodes 13, and the current detecting units 223 detect currents flowing through the X electrodes 13. Similarly, through the second switching unit 26, the current detecting units 223 are connected to Y electrodes 14, the AC voltage sources 224 apply voltages to the Y electrodes 14, and the current detecting units 223 detect currents flowing through the Y electrodes 14. The internal circuit of the touch panel driving circuit 22 illustrated in FIG. 14 corresponds to a detection circuit.

In a state in which a user's finger is not brought into contact with the contact face 11, even when voltages are applied from the AC voltage source 224 to the X electrodes 13 or the Y electrodes 14, currents hardly flow, and currents detected by the current detecting units 223 are almost zero. More specifically, a slight current flows through the parasitic capacitance of each X electrode 13 and the parasitic capacitance of each Y electrode 14. The current flowing through the parasitic capacitance is called a parasitic current. Each current detecting unit 223 detects a parasitic current. In a case where a user's finger is brought into contact with a portion on the contact face 11 that faces an X electrode 13 connected to the touch panel driving circuit 22, electrostatic capacitance is generated between the X electrode 13 and the finger. An AC voltage is applied from the AC voltage source 224, a current according to the electrostatic capacitance flows through the X electrode 13, and the current detecting unit 223 detects the current. Similarly, electrostatic capacitance is generated between a user's finger brought into contact with the contact face 11 and the Y electrode 14 connected to the touch panel driving circuit 22, a current according to the electrostatic capacitance flows through the Y electrode 14, and the current detecting unit 223 detects the current. The norm of the current detected by the current detecting unit 223 is proportional to the generated electrostatic capacitance. In more details, an increased amount of the norm of the current detected by the current detecting unit 223 from a norm of a parasitic current is proportional to the generated electrostatic capacitance.

The operations of the first switching unit 25 and the second switching unit 26 are controlled by a control circuit 21, and the X electrode 13 and the Y electrode 14 connected to the touch panel driving circuit 22 are specified under the control of the control circuit 21. The control circuit 21 detects generation of electrostatic capacitance in accordance with the norm of the current detected by the current detecting unit 223 being a predetermined value or more for each of the X electrodes 13 and the Y electrodes 14 connected to the touch panel driving circuit 22. In addition, the control circuit 21 specifies the X electrode 13 and the Y electrode 14 in which the electrostatic capacitance is generated, in other words, the X electrode 13 and the Y electrode 14 connected to the touch panel driving circuit 22 when the electrostatic capacitance is generated, thereby detecting a position with which the user's finger is brought into contact. The contact position is a position on the contact face 11 that faces a portion at which the X electrode 13 and the Y electrode 14, in which the electrostatic capacitance is generated, intersect each other. The control circuit 21 outputs data representing the contact position to an arithmetic operation unit 31. In this way, the tactile presentation device detects a contact position on the contact face 11 by using a self capacitance system.

In addition, the tactile presentation device may employ a form in which not only a contact position on the contact face 11 is detected but also a position at which an object approaches is detected in a case where the conductive object such as a finger approaches the contact face 11 within a predetermined distance. In such a form, in a case where an object approaches the contact face 11 within a predetermined distance, electrostatic capacitance is generated between the X electrode 13 and the Y electrode 14 and the object, and, similarly, a position approached by the object on the contact face 11 is detected.

The control circuit 21, similar to Embodiment 1, by controlling the first switching unit 25 and the second switching unit 26, connects some X electrodes 13 and some Y electrodes 14 to the touch panel driving circuit 22 and sequentially changes the X electrodes 13 and the Y electrodes 14 connected to the touch panel driving circuit 22. In addition, similar to Embodiment 1, the control circuit 21 connects the X electrodes 13 not connected to the touch panel driving circuit 22 to the X electrode driving circuit 23 and connects the Y electrodes 14 not connected to the touch panel driving circuit 22 to the Y electrode driving circuit 24. In other words, also in this embodiment, some X electrodes 13 and some Y electrodes 14 are controlled for detecting contact on the contact face 11, and the X electrodes 13 and the Y electrodes 14 controlled for detecting contact are sequentially changed, and each of the X electrodes 13 and the Y electrodes 14 is controlled for presenting a tactile sense to the contact face 11 at timings other than the timing at which the electrodes are controlled for detecting contact. For this reason, also in this embodiment, the tactile presentation device can simultaneously perform the presentation of a tactile sense and the detection of a contact position, and a tactile sense felt by a user during the use of the tactile presentation device is not interrupted.

In Embodiments 1 and 2 described above, while a form in which the control circuit 21 is included in addition to the touch panel driving circuit 22, the X electrode driving circuit 23, the Y electrode driving circuit 24, the first switching unit 25, and the second switching unit 26 is illustrated, the tactile presentation device may employ a form not including the control circuit 21. For example, the tactile presentation device may employ a form in which the touch panel driving circuit 22 has functions equivalent to those of the control circuit 21. In addition, the tactile presentation device may employ a form in which the functions equivalent to those of the control circuit 21 are included in the touch panel driving circuit 22, the X electrode driving circuit 23, the Y electrode driving circuit 24, the first switching unit 25, and the second switching unit 26 in a distributed manner. Furthermore, the tactile presentation device may employ a form in which the operations of the touch panel driving circuit 22, the X electrode driving circuit 23, the Y electrode driving circuit 24, the first switching unit 25, and the second switching unit 26 are directly controlled by the arithmetic operation unit 31.

In Embodiments 1 and 2, while a form in which a tactile sense is presented using a beat between AC voltages applied to a specific X electrode 13 and a specific Y electrode 14 is illustrated, the tactile presentation device may employ a form in which a tactile sense is presented using a method other than methods that are generally known. For example, the tactile presentation device may employ a form in which a tactile sense is presented by applying the same AC voltage to a specific X electrode 13 and a specific Y electrode 14 or a form in which a tactile sense is presented by applying the same AC voltage to all the X electrodes 13 and all the Y electrodes 14. In addition, the tactile presentation device may employ a form in which a tactile sense is presented by applying voltages having opposite polarities to the X electrodes 13 adjacent to each other or the Y electrodes 14 adjacent to each other.

Furthermore, the tactile presentation device may employ a form in which a position at which an object approaches or is in contact with the contact face 11 is detected using a generally-known method other than the methods described in Embodiments 1 and 2 described above. For example, the tactile presentation device may employ a form in which a current value of a voltage signal applied to the X electrode 13 and the Y electrode 14 for presenting a tactile sense is measured, and contact or approach of an object is detected according to a change in the measured current value.

In Embodiments 1 and 2, while a form in which the X electrodes 13 and the Y electrodes 14 are arranged such that the intersections of the X electrodes 13 and the Y electrodes 14 are arranged in a matrix pattern has been illustrated, the tactile presentation device may employ a form in which the X electrodes 13 and the Y electrodes 14 are arranged in any other form. For example, the tactile presentation device may employ a form in which the X electrodes 13 and the Y electrodes 14 are arranged such that the intersections of the X electrodes 13 and the Y electrodes 14 are arranged in a shape to be represented through a tactile sense.

Embodiment 3

In Embodiment 3, a form is illustrated in which electrodes are arranged in a form different from those of Embodiments 1 and 2. The configuration of a tactile presentation device is similar to that of the case of Embodiment 1 illustrated in FIGS. 1 and 2 except for the insides of a tactile panel 1 and a tactile panel driving unit 2.

Figure 15:
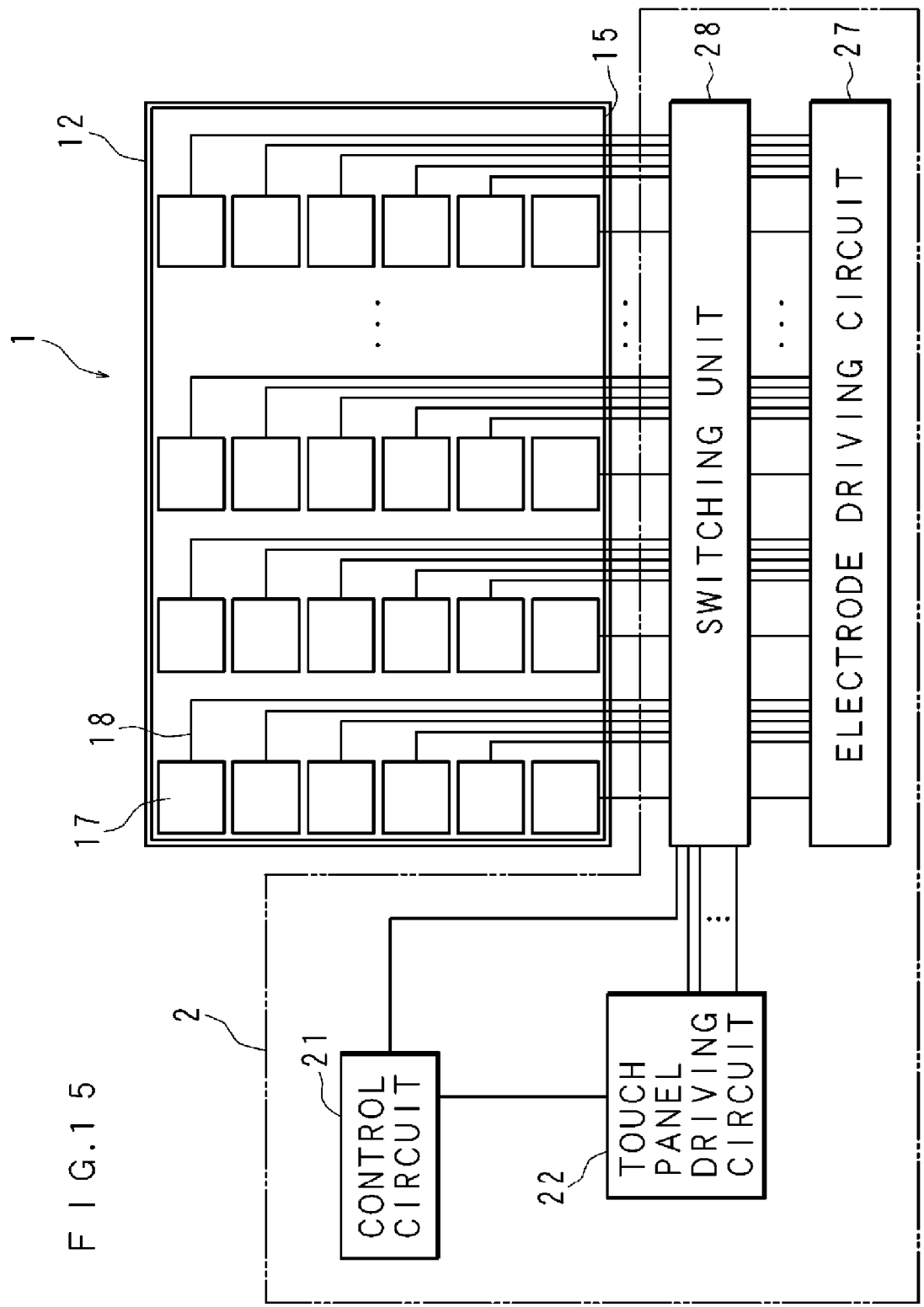
FIG. 15 is a block diagram that illustrates the internal configurations of a tactile panel and a tactile panel driving unit according to Embodiment 3.

FIG. 15 is a block diagram that illustrates the internal configurations of the tactile panel 1 and the tactile panel driving unit 2 according to Embodiment 3. The tactile panel 1 includes a transparent substrate 12 such as a glass substrate, and a plurality of electrodes 17 are arranged on the substrate 12. The shape of each electrode 17 is a rectangle, and the electrodes 17 are arranged in a matrix pattern. FIG. 15 illustrates an example in which the electrodes 17 are arranged in 6 rows×9 columns. A wiring 18 is connected to each electrode 17. In FIG. 15, while a reference numeral 17 is assigned to one electrode and a reference numeral 18 is assigned to one wiring, all the rectangular electrodes illustrated in FIG. 15 are electrodes 17, and all the wirings connected to the electrodes 17 are wirings 18. A direction along one row illustrated in FIG. 15 is set as an X direction, and a direction along one column is set as a Y direction. The plurality of electrodes 17 are insulated from each other. On the substrate 12, a cover layer 15 having an insulating property is superimposed with the electrodes 17 interposed therebetween. The surface of the cover layer 15 is the contact face 11.

The tactile panel driving unit 2 includes a touch panel driving circuit (first control unit) 22 used for controlling the operations of the electrodes 17 for detecting contact on the contact face 11. The tactile panel driving unit 2 includes an electrode driving circuit 27 used for controlling the operations of the electrodes 17 for presenting a tactile sense to the contact face 11. The electrode driving circuit 27 corresponds to a second control unit. In addition, the tactile panel driving unit 2 includes a switching unit 28 to which a plurality of wirings 18 are connected. The electrodes 17 are connected to the switching unit 28 through the wirings 18. The switching unit 28 connects some electrodes 17 to the touch panel driving circuit 22, connects the other electrodes 17 to the electrode driving circuit 27, and is configured to switch the connection of each electrode 17 to one side to the other side.

The tactile panel driving unit 2 includes a control circuit 21. The control circuit 21 is connected to the touch panel driving circuit 22, the electrode driving circuit 27, and the switching unit 28. In addition, the control circuit 21 is connected to an arithmetic operation unit 31. The control circuit 21 receives an input of a control signal from the arithmetic operation unit 31 and controls the operations of the touch panel driving circuit 22, the electrode driving circuit 27, and the switching unit 28. The control circuit 21 and the switching unit 28 correspond to a third control unit.

Figure 16:
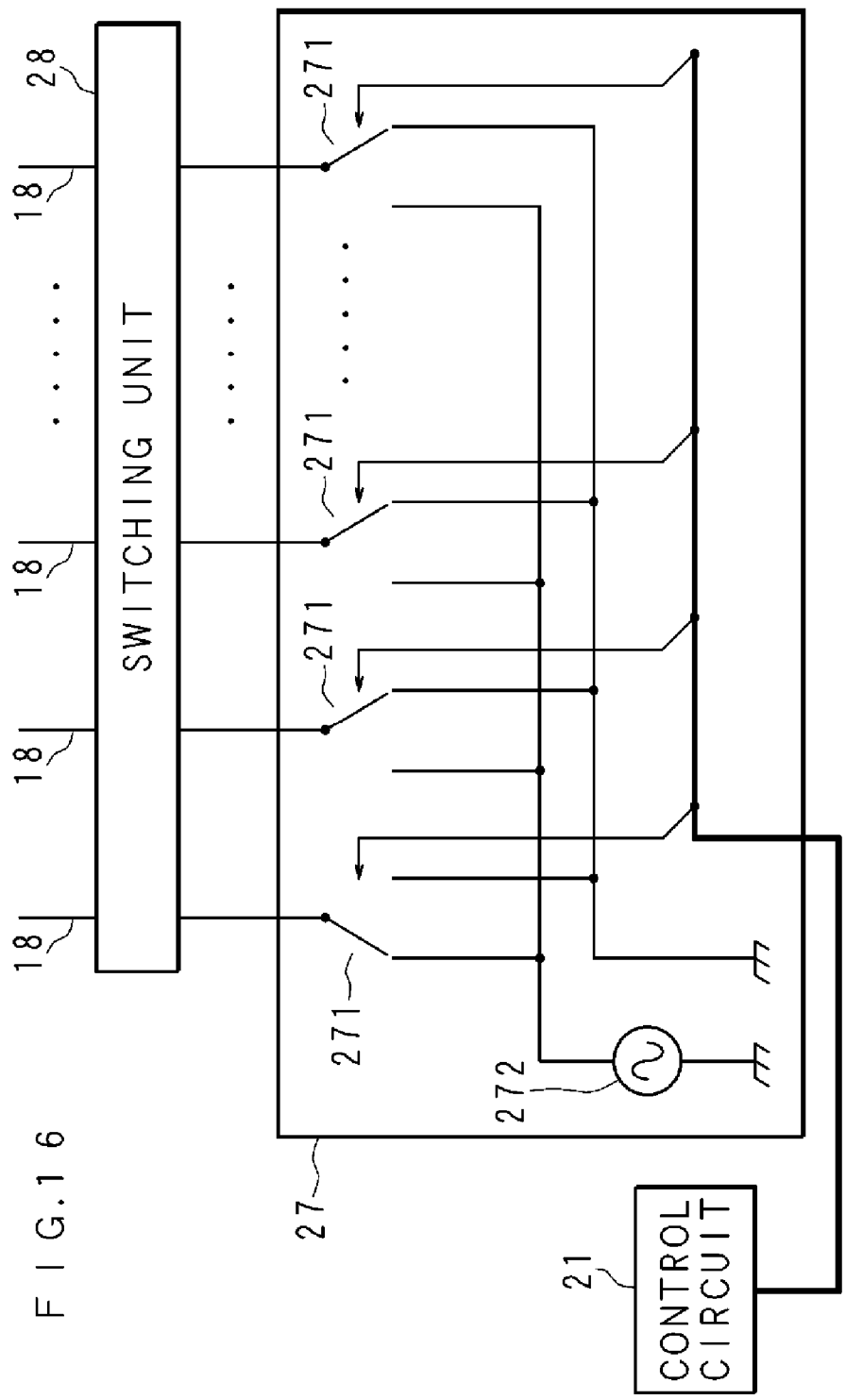
FIG. 16 is a schematic circuit diagram that illustrates the internal configuration of an electrode driving circuit according to Embodiment 3.

FIG. 16 is a schematic circuit diagram that illustrates the internal configuration of the electrode driving circuit 27 according to Embodiment 3. The electrode driving circuit 27 includes a plurality of single-pole double-throw switches 271 and an AC voltage source 272 that generates an AC voltage having a predetermined frequency. The internal circuit of the electrode driving circuit 27 is configured to connect each wiring 18 connected through the switching unit 28 to one of the AC voltage source 272 and the ground by using each single-pole double-throw switch 271. Each single-pole double-throw switch 271 is controlled by the control circuit 21 and performs switching of a connection between each wiring 18 and the AC voltage source 272 or the ground. In other words, the electrode driving circuit 27 connects the electrode 17 connected through the switching unit 28 and the wiring 18 to one of the AC voltage source 272 and the ground, and switches the connection under the control of the control circuit 21. The internal circuit of the electrode driving circuit 27 illustrated in FIG. 16 corresponds to a signal applying circuit.

The tactile presentation device presents a tactile sense to the contact face 11 by using the operation of the electrode driving circuit 27. In a case where an AC voltage is applied to an electrode 17 facing a user's finger brought into contact with the contact face 11, an electrostatic force that periodically changes is generated between the electrode 17 and the finger. When the user traces the contact face 11 by using a finger, a frictional force felt by the finger periodically changes, whereby a tactile sense is presented. The frequency of the AC voltage applied by the AC voltage source 272 is higher than 5 Hz and lower than 1000 Hz. For example, the frequency is 120 Hz. For this reason, a user can perceive a tactile sense on the contact face 11.

The electrode driving circuit 27, under the control of the control circuit 21, connects some electrodes 17 among electrodes 17 connected to the electrode driving circuit 27 to the AC voltage source 272 and connects the other electrodes 17 to the ground. In a portion on the contact face 11 that faces the electrode 17 connected to the AC voltage source 272, a periodical electrostatic force is generated, and a user can perceive a tactile sense by using his finger. In the other portions, an electrostatic force is not generated, and a tactile sense is not perceived. In this way, the tactile presentation device can present a tactile sense at an arbitrary position of the contact face 11. The electrode driving circuit 27 may employ a form in which the electrodes 17 are connected not to the ground but a predetermined DC power source.

Figure 17:
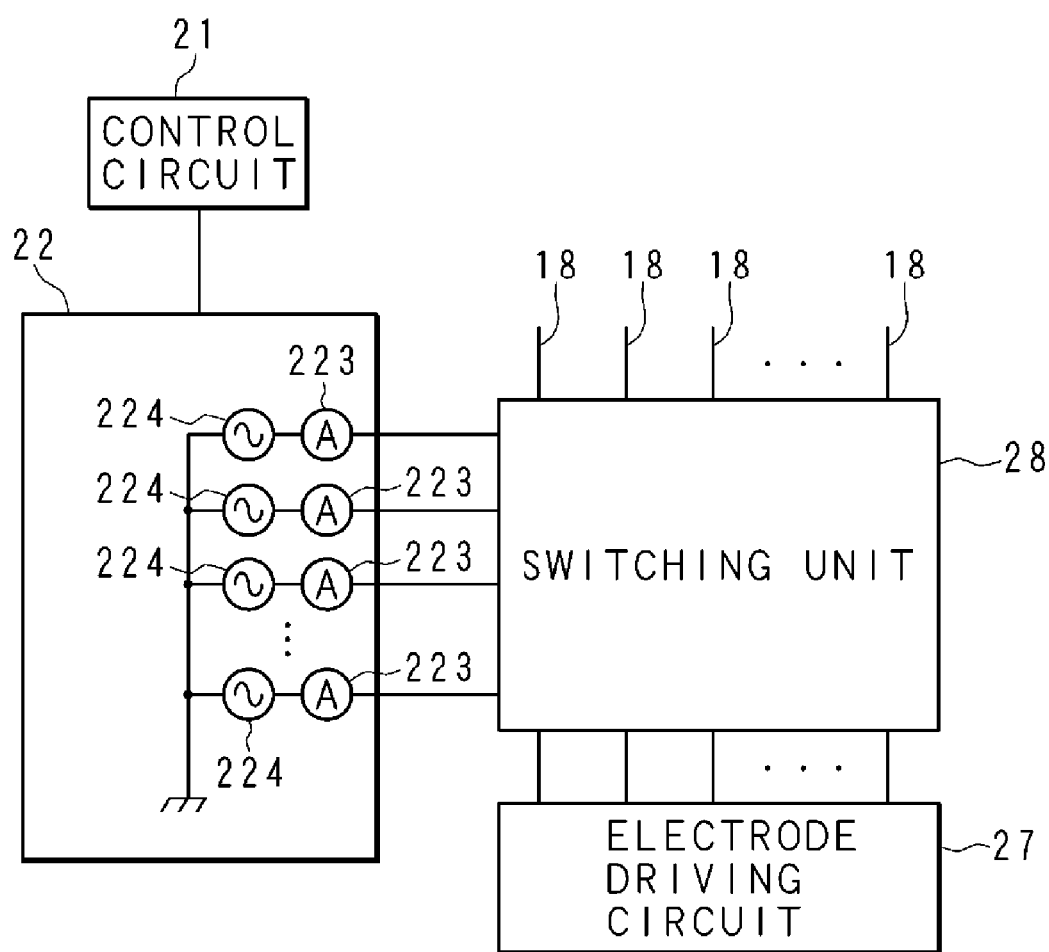
FIG. 17 is a schematic circuit diagram that illustrates the internal configuration of a touch panel driving circuit according to Embodiment 3.

FIG. 17 is a schematic circuit diagram that illustrates the internal configuration of the touch panel driving circuit 22 according to Embodiment 3. The touch panel driving circuit 22 includes a plurality of current detecting units 223 and a plurality of AC voltage sources 224. Each current detecting unit 223 is connected to a signal line connected to the switching unit 28. The AC voltage source 224 is connected to each current detecting unit 223. The AC voltage source 224 is connected to the ground. Through the switching unit 28 and a wiring 18, the current detecting unit 223 is connected to the electrode 17, the AC voltage source 224 applies a voltage to the electrode 17, and the current detecting unit 223 detects a current flowing through the electrode 17. The internal circuit of the touch panel driving circuit 22 illustrated in FIG. 17 corresponds to a detection circuit.

In a state in which a user's finger is not brought into contact with the contact face 11, even when a voltage is applied from the AC voltage source 224 to the electrode 17, a current hardly flows, and a current detected by the current detecting unit 223 is almost zero. In more details, similar to Embodiment 2, the current detecting unit 223 detects a parasitic current. In a case where a user's finger is brought into contact with a portion on the contact face 11 that faces the electrode 17 connected to the touch panel driving circuit 22, electrostatic capacitance is generated between the electrode 17 and the finger. An AC voltage is applied from the AC voltage source 224, a current increased according to the electrostatic capacitance flows through the electrode 17, and the current detecting unit 223 detects the current. An increased amount of the norm of the current detected by the current detecting unit 223 is proportional to the generated electrostatic capacitance.

The operation of the switching unit 28 is controlled by the control circuit 21, and the electrode 17 to be connected to the touch panel driving circuit 22 is specified under the control of the control circuit 21. The control circuit 21 detects generation of electrostatic capacitance in accordance with the norm of the current detected by the current detecting unit 223 being a predetermined value or more for each electrode 17 connected to the touch panel driving circuit 22. In addition, the control circuit 21 specifies an electrode 17 in which the electrostatic capacitance is generated, in other words, an electrode 17 connected to the touch panel driving circuit 22 when the electrostatic capacitance is generated, thereby detecting a position with which the user's finger is brought into contact. The contact position is a position on the contact face 11 that faces the electrode 17 in which the electrostatic capacitance is generated. The control circuit 21 outputs data representing the contact position to the arithmetic operation unit 31. In this way, the tactile presentation device detects a contact position on the contact face 11 by using a self-capacitance system.

In addition, the tactile presentation device may employ a form in which not only a contact position on the contact face 11 is detected but also a position at which an object approaches is detected in a case where the conductive object such as a finger approaches the contact face 11 within a predetermined distance. In such a form, in a case where an object approaches the contact face 11 within a predetermined distance, electrostatic capacitance is generated between the electrode 17 and the object, and, similarly, a position approached by the object on the contact face 11 is detected.

The control circuit 21 performs control of the switching unit 28 to connect each electrode 17 to either the touch panel driving circuit 22 or the electrode driving circuit 27. The control circuit 21 causes the switching unit 28 to connect some electrodes 17 to the touch panel driving circuit 22 and connects the other electrodes 17 to the electrode driving circuit 27. In addition, the control circuit 21 causes the switching unit 28 to sequentially change the electrodes 17 to be connected to the touch panel driving circuit 22. When the electrode 17 connected to the touch panel driving circuit 22 is changed, the switching unit 28 connects the electrode 17 that has been connected to the touch panel driving circuit 22 until now to the electrode driving circuit 27 and connects some electrodes among a plurality of electrodes 17 that have been connected to the electrode driving circuit 27 until now to the touch panel driving circuit 22. In addition, the control circuit 21, by controlling the single-pole double-throw switch 271 of the electrode driving circuit 27, connects an electrode 17 corresponding to an area to which a tactile sense is to be presented among the electrodes 17 connected to the electrode driving circuit 27 to the AC voltage source 272 and connects the other electrodes 17 to the ground.

Under the control of the control circuit 21, each of the plurality of electrodes 17 is sequentially connected to the touch panel driving circuit 22, and detection of contact at a position on the contact face 11 that faces each electrode 17 is sequentially performed. By sequentially connecting each electrode 17 to the touch panel driving circuit 22, each electrode 17 is sequentially controlled for detecting contact on the contact face 11. In other words, the contact face 11 is scanned for detection of a contact position. After the completion of the scanning of the whole contact face 11, the control circuit 21 repeats the process of sequentially connecting each electrode 17 to the touch panel driving circuit 22. In this way, the scanning is repeated, and, in a case where a user contacts an arbitrary position on the contact face 11, the contact point is detected. The scanning of the whole contact face 11 is repeated 10 to 1000 times per one second. For example, the scanning of the whole contact face 11 is repeated 120 times per one second. In a period other than the period in which the electrode 17 is connected to the touch panel driving circuit 22, the electrode 17 is connected to the electrode driving circuit 27 under the control of the control circuit 21. Some electrodes 17 are connected to the AC voltage source 272, and the other electrodes 17 are connected to the ground. As a result, a tactile sense is presented to the contact face 11. In this way, the electrodes 17 are controlled for presenting a tactile sense to the contact face 11.

FIG. 18 is a timing diagram that illustrates an example of a change in each electrode 17 state with respect to time according to Embodiment 3. The vertical axis represents the position of each electrode 17. Numbers of 0 to 8 are assigned to the electrodes 17 disposed along the X direction, numbers of 0 to 5 are assigned to the electrodes 17 disposed along the Y direction, and the position of each electrode 17 is represented using a combination of an X-direction number and a Y-direction number. The horizontal axis represents the elapse of time, and, the elapse of time is represented by attached numbers of 1 to 9 to periods dividing the time. The length of each period is 0.925 ms. In the drawing, each hatched portion represents that an electrode 17 located at a position corresponding to the portion in a period corresponding to the portion is controlled for detecting contact. The other portions represent that the electrodes 17 are controlled for presenting a tactile sense. A column of a period to which number "1" is assigned represents that state of each electrode 17 in a time period of 0 to 0.925 ms, and a column of a period to which number "2" is assigned represents that state of each electrode 17 in the next 0.925 ms. In the period to which number "1" is assigned, the electrodes 17 controlled for detecting contact are six electrodes 17 of which positions represented by (X, Y) are (0, 0), (0, 3), (3, 0), (3, 3), (6, 0), and (6, 3). The other electrodes 17 are controlled for presenting a tactile sense. In the period to which number "2" is assigned, the electrodes 17 controlled for detecting contact are six electrodes 17 of (0, 1), (0, 4), (3, 1), (3, 4), (6, 1), and (6, 4). As illustrated in FIG. 18, in periods to which numbers "1" to "9" are assigned, all the electrodes 17 are sequentially controlled for presenting a tactile sense, and the scanning of the whole contact face 11 is completed in a time of 8.3 ms.

As above, in this embodiment, also in a period in which some electrodes 17 are controlled for detecting contact on the contact face 11, the other electrodes 17 are controlled for presenting a tactile sense to the contact face 11. For this reason, the tactile presentation device can simultaneously perform the presentation of a tactile sense and the detection of a contact position. In addition, the electrode 17 controlled for detecting contact on the contact face 11 is sequentially changed, and each electrode 17 is controlled for presenting a tactile sense to the contact face 11 at timings other than the timing at which the electrode 17 is controlled for detecting contact. While the presentation of a tactile sense is not performed at a position at which the detection of contact on the contact face 11 is performed, the position at which the contact is detected is sequentially moved, and accordingly, the presentation of a tactile sense is not interrupted on the whole contact face 11. Also in this embodiment, the tactile presentation device can simultaneously perform the presentation of a tactile sense and the detection of a contact position, and a tactile sense felt by a user during the use of the tactile presentation device is not interrupted.

In addition, in this embodiment, the control circuit 21 causes the switching unit 28 to connect an electrode 17 adjacent to an electrode 17 connected to the touch panel driving circuit 22 to the electrode driving circuit 27. In this way, the electrode 17 adjacent to the electrode 17 controlled for detecting contact on the contact face 11 is controlled for presenting a tactile sense. For this reason, the size of a portion not used for presenting a tactile sense on the contact face 11 is minimized.

In the example illustrated in FIG. 18, a plurality of electrodes 17 not adjacent to each other are simultaneously controlled for detecting contact on the contact face 11. Accordingly, a time required for sequentially controlling all the electrodes 17 for detecting contact can be shortened, and a time required for scanning the whole contact face 11 can be shortened. In addition, since contact is detected simultaneously in a plurality of positions on the contact face 11, the tactile presentation device can quickly detect contact positions.

In this embodiment, a distance between the centers of the electrodes 17 adjacent to each other is configured to be sufficiently smaller than an area in which a person's finger is brought into contact with the contact face 11. For example, in both the X direction and the Y direction, a distance between the centers of the electrodes 17 adjacent to each other is configured to be 5 mm. The size of a portion not used for presenting a tactile sense to the contact face 11 is sufficiently smaller than the size of a user's finger. In a portion in which a user's finger is brought into contact with the contact face 11, even in a case where a part does not present a tactile sense, a tactile sense is presented to the other part, and a tactile sense averaged over the whole finger is perceived.

In this embodiment, a time interval for changing the electrode 17 controlled for detecting contact on the contact face 11 is set to be shorter than 10 ms that is the time resolution of the tactile sense. In more details, a value acquired by integrating a function of a temporal change in the relative decreased amount of the electrostatic force in a portion in which the user's finger is brought into contact with the contact face 11 with respect to time is configured to be less than 10 ms. For example, the control circuit 21 performs control of a time interval for changing the electrode 17 controlled for detecting contact to be less than 10 ms. In the example illustrated in FIG. 18, a time interval for changing the electrode 17 controlled for detecting contact is 0.925 ms. A decrease in the electrostatic force occurs within a shorter period than the time resolution of the tactile sense, and, even in a case where the electrostatic force is decreased, the perceived electrostatic force is averaged over the whole finger not to be zero, and accordingly, an interruption of the presentation of a tactile sense is not perceived by the user.

In FIG. 18, while an example is illustrated in which an electrode 17 adjacent to the electrode 17 controlled for detecting contact on the contact face 11 is an electrode 17 controlled next for detecting contact, the tactile presentation device may employ a form in which the position of the electrode 17 controlled for detecting contact is discretely changed. By discretely changing the position of the electrode 17 controlled for detecting contact, timings at which the electrostatic force decreases in a plurality of areas included within the contact portion where the user's finger touches the contact face 11 are discrete. For this reason, the period in which the presented tactile sense is interrupted is further shortened, and the effect of user's no perception of an interruption of the tactile sense is further improved.

Fourth Embodiment 4

A tactile presentation device according to Embodiment 4 detects a contact position on a contact face 11 by using a mutual capacitance system. The configuration of a tactile presentation device is similar to that of the case of Embodiment 1 illustrated in FIGS. 1 and 2 except for the insides of a tactile panel 1 and a tactile panel driving unit 2. Similar to the case of Embodiment 3 illustrated in FIG. 15, a tactile panel 1 includes: a substrate 12, a plurality of rectangular electrodes 17 arranged on the substrate 12 in a matrix pattern; and a cover layer 15. Similarly, the tactile panel driving unit 2, as illustrated in FIG. 15, includes: a touch panel driving circuit 22; an electrode driving circuit 27; a switching unit 28; and a control circuit 21.

Figure 19:
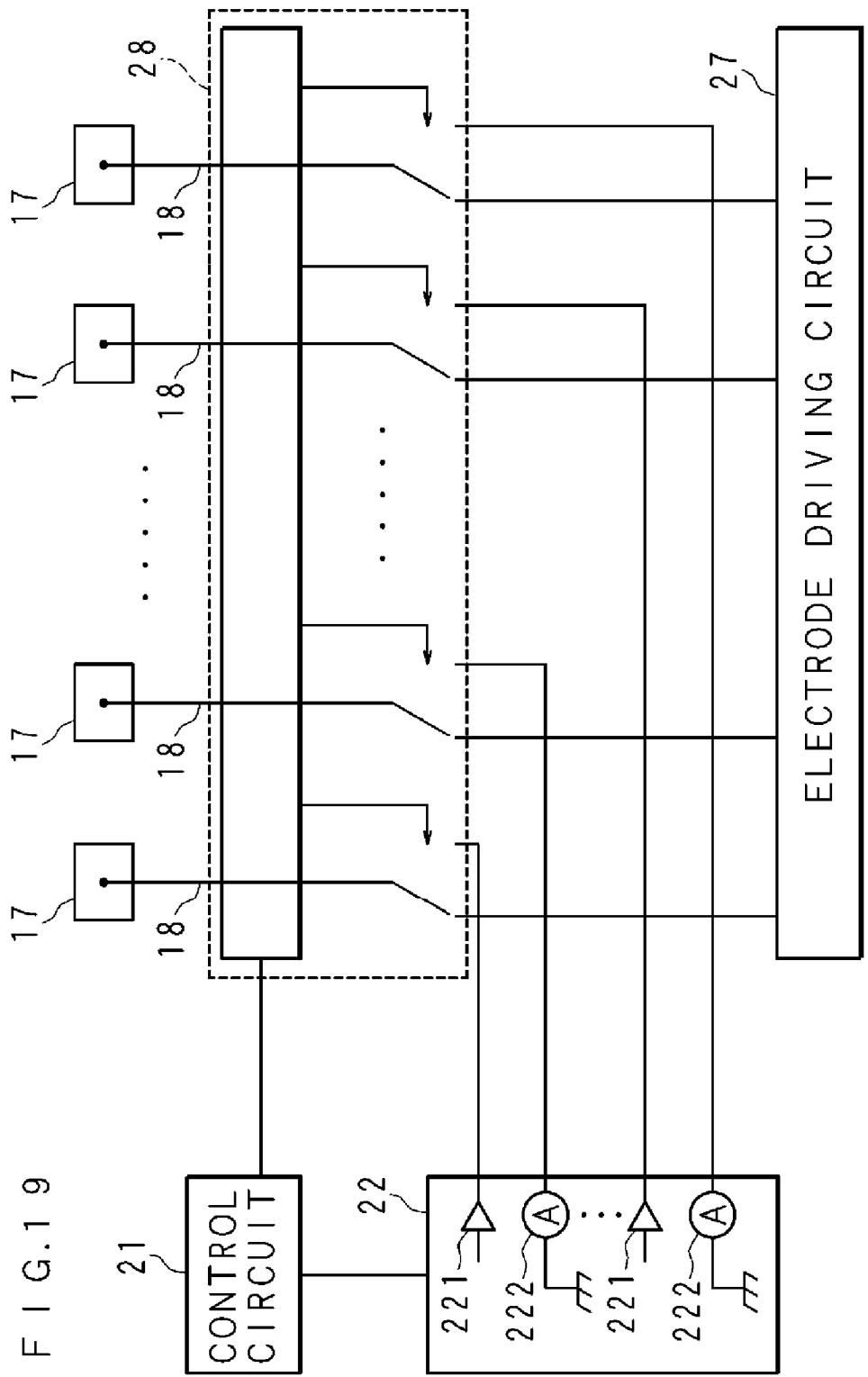
FIG. 19 is a schematic circuit diagram that illustrates the internal configurations of a touch panel driving circuit and a switching unit according to Embodiment 4.

FIG. 19 is a schematic circuit diagram that illustrates the internal configurations of the touch panel driving circuit 22 and the switching unit 28 according to Embodiment 4. The plurality of electrodes 17 included in the tactile panel is configured by a plurality of electrode pairs each formed by one pair of electrodes 17 adjacent to each other. Each electrode 17 is connected to the switching unit 28 through a wiring 18. The switching unit 28 is configured to connect some electrodes 17 to the touch panel driving circuit 22 and connect the other electrodes 17 to the electrode driving circuit 27 and to be able to switch the connection of each electrode 17 to one side to the other side. The switching unit 28 performs the switching in units of electrode pairs. In other words, two electrodes 17 included in an electrode pair have the connections to be simultaneously switched and are connected to a same circuit out of the touch panel driving circuit 22 and the electrode driving circuit 27. The touch panel driving circuit 22 includes a plurality of signal input units 221 and a plurality of current detecting units 222. The touch panel driving circuit 22 and the switching unit 28 are configured such that, when an electrode pair is connected to the touch panel driving circuit 22, one electrode 17 is connected to the signal input unit 221, and the other electrode 17 is connected to the current detecting unit 222. The signal input unit 221 inputs an AC signal to one electrode 17, and the current detecting unit 222 detects a current signal flowing through the other electrode 17. The internal circuit of the touch panel driving circuit 22 illustrated in FIG. 19 corresponds to a detection circuit.

Electrostatic capacitance is generated between two electrodes 17, which are included in an electrode pair, adjacent to each other. In a case where the signal input unit 221 inputs an AC signal to one electrode 17, an AC current flows between the two electrodes 17, and the current detecting unit 222 detects the AC current. In a case where a user's finger is brought into contact with a portion on the contact face 11 that faces the electrode pair, electrostatic capacitance is generated between the electrode pair and the finger, and the electrostatic capacitance between the two electrodes 17 changes. In a case where the electrostatic capacitance between the two electrodes 17 changes, the AC current detected by the current detecting unit 222 changes. The operation of the switching unit 28 is controlled by the control circuit 21, and the electrode pair connected to the touch panel driving circuit 22 is specified under the control of the control circuit 21. The control circuit 21 compares the AC current detected by the current detecting unit 222 with a predetermined threshold and detects that whether the electrostatic capacitance between the electrode pair connected to the touch panel driving circuit 22 has been changed. In a case where the electrostatic capacitance changes, the control circuit 21 specifies the electrode pair connected to the touch panel driving circuit 22, thereby detecting a position with which the user's finger is brought into contact. The contact position is a position on the contact face 11 that faces the electrode pair connected to the touch panel driving circuit 22. The control circuit 21 outputs data representing the contact position to the arithmetic operation unit 31. In this way, the tactile presentation device detects a contact position on the contact face 11 by using a mutual capacitance system.

In addition, the tactile presentation device may employ a form in which not only a contact position on the contact face 11 is detected but also a position at which an object approaches is detected in a case where the conductive object such as a finger approaches the contact face 11 within a predetermined distance. In such a form, in a case where an object approaches the contact face 11 within a predetermined distance, electrostatic capacitance is generated between the electrode pair and the object, and, similarly, a position approached by the object on the contact face 11 is detected.

The configuration of the electrode driving circuit 27 is similar to that of Embodiment 3 illustrated in FIG. 16. The control circuit 21 performs control of the switching unit 28 to connect each electrode pair to either the touch panel driving circuit 22 or the electrode driving circuit 27. The control circuit 21 causes the switching unit 28 to connect some electrode pairs to the touch panel driving circuit 22 and connects the other electrode pairs to the electrode driving circuit 27. In addition, the control circuit 21 causes the switching unit 28 to sequentially change the electrode pair to be connected to the touch panel driving circuit 22. When the electrode pair connected to the touch panel driving circuit 22 is changed, the switching unit 28 connects the electrode pair that has been connected to the touch panel driving circuit 22 until now to the electrode driving circuit 27 and connects some electrode pairs among a plurality of electrode pairs that have been connected to the electrode driving circuit 27 until now to the touch panel driving circuit 22. In addition, the control circuit 21, by controlling the single-pole double-throw switches 271 of the electrode driving circuit 27, connects an electrode 17 among the electrodes 17 connected to the electrode driving circuit 27 that corresponds to an area to which a tactile sense is to be presented to the AC voltage source 272 and connects the other electrodes 17 to the ground.

Under the control of the control circuit 21, each of the plurality of electrode pairs is sequentially connected to the touch panel driving circuit 22, and detection of contact at a position on the contact face 11 that faces each electrode pair is sequentially performed. By sequentially connecting each electrode pair to the touch panel driving circuit 22, each electrode pair is sequentially controlled for detecting contact on the contact face 11. In other words, the contact face 11 is scanned for detection of a contact position. After the completion of the scanning of the whole contact face 11, the control circuit 21 repeats the process of sequentially connecting each electrode pair to the touch panel driving circuit 22. In this way, the scanning is repeated, and, in a case where a user contacts an arbitrary position on the contact face 11, the contact point is detected. In a period other than the period in which an electrode 17 is connected to the touch panel driving circuit 22, the electrode 17 is connected to the electrode driving circuit 27 under the control of the control circuit 21. Some electrodes 17 are connected to the AC voltage source 272, and the other electrodes 17 are connected to the ground. As a result, a tactile sense is presented to the contact face 11. In this way, the electrodes 17 are controlled for presenting a tactile sense to the contact face 11.

Figure 20:
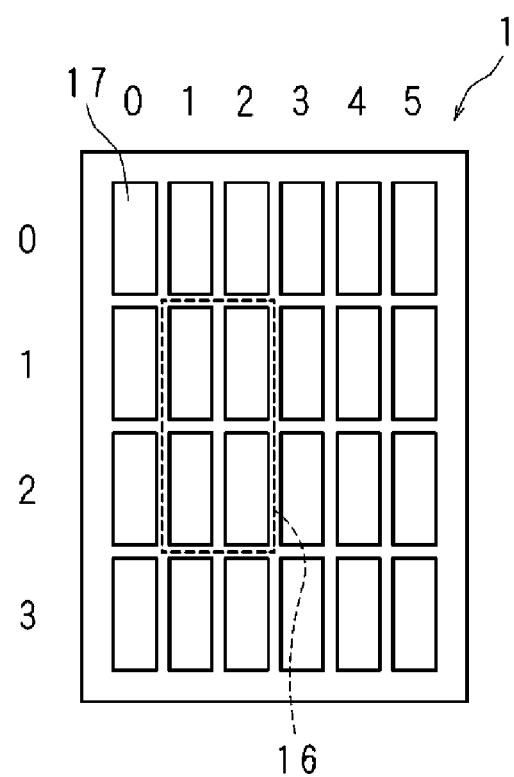
FIG. 20 is a schematic view that illustrates an example of a tactile panel according to Embodiment 4.

FIG. 20 is a schematic view that illustrates an example of the tactile panel 1 according to Embodiment 4. FIG. 20 illustrates an example in which the electrodes 17 are arranged in 4 rows×6 columns. In FIG. 20, while a reference numeral 17 is assigned to one electrode, all the rectangular electrodes illustrated in FIG. 20 are electrodes 17. Numbers of 0 to 5 are assigned to the electrodes 17 disposed along the X direction, numbers of 0 to 3 are assigned to the electrodes 17 disposed along the Y direction, and the position of each electrode 17 is represented using a combination of an X-direction number and a Y-direction number. In the example illustrated in FIG. 20, an electrode 17 arranged in an even-numbered column and an electrode 17 arranged in the next column configure an electrode pair. For example, electrodes 17 located at positions (0, 0) and (1, 0) configure an electrode pair. Areas corresponding to the electrodes 17 located at positions of (1, 1), (1, 2), (2, 1), and (2, 2) are assumed to be target areas 16 to which a tactile sense is presented.

Figure 21:
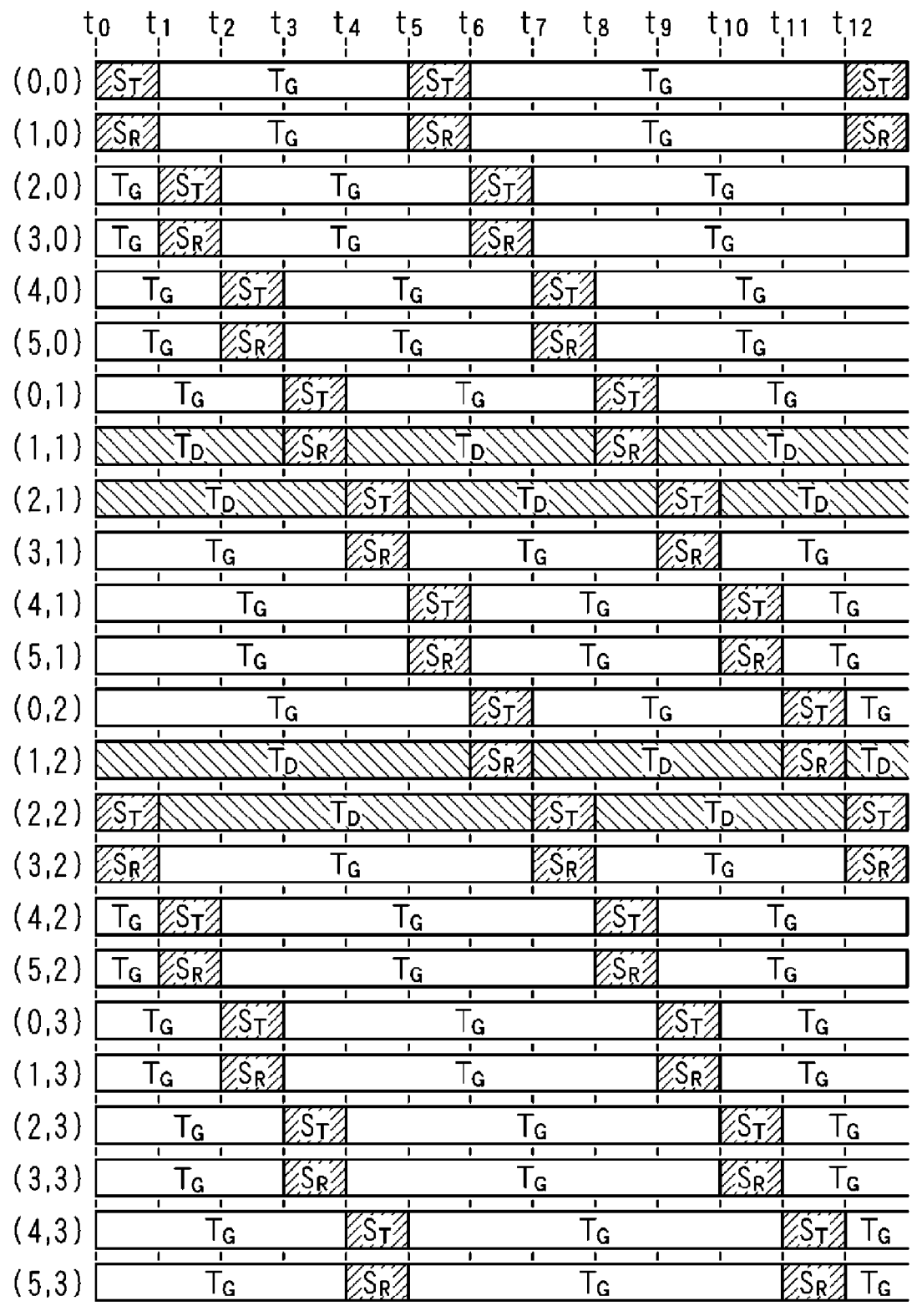
Figure 22A:
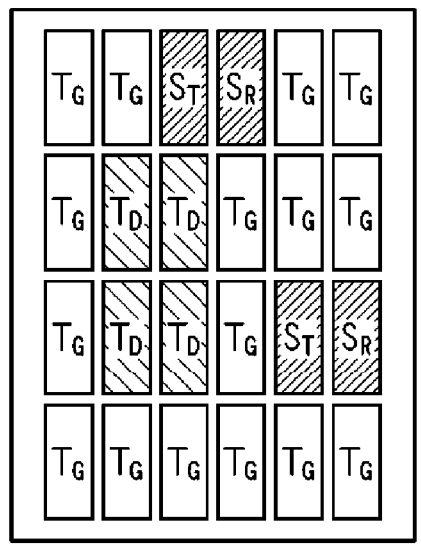
FIGS. 22A to 22C are schematic views that illustrate the states of the tactile panel at specific timings according to Embodiment 4.
Figure 22B:
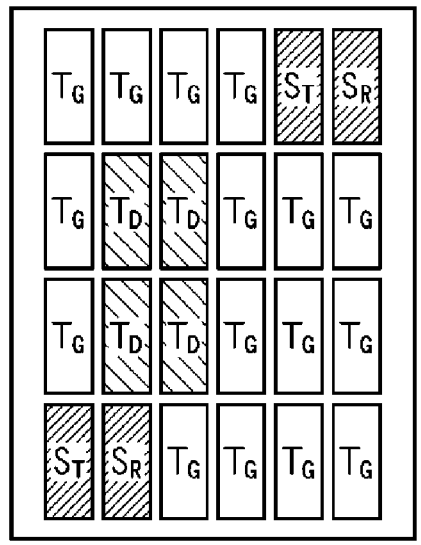
Figure 22C:
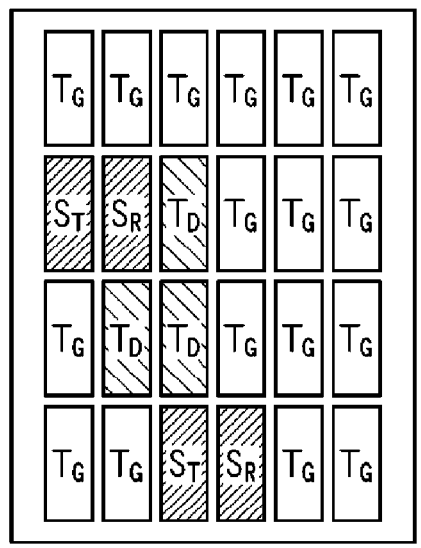

FIG. 21 is a timing diagram that illustrates an example of the operation of each electrode 17 according to Embodiment 4. In FIG. 21, the left side to the right side represent the elapse of time, and $t_0$ to $t_{12}$ represent respective time points. FIG. 21 illustrates the states of electrodes 17 of which positions are represented as (X, Y) at each time point. FIGS. 22A to 22C are schematic views that illustrate the states of the tactile panel 1 at specific timings according to Embodiment 4. FIGS. 22A, 22B, and 22C respectively illustrate the states of periods of $t_1$ to $t_2$, $t_2$ to $t_3$, and $t_3$ to $t_4$. A state in which the electrode 17 is connected to the ground is denoted by $T_G$, a state in which the electrode 17 is connected to the AC voltage source 272 is denoted by $T_D$, a state in which the electrode 17 is connected to the signal input unit 221 is denoted by $S_T$, and a state in which the electrode 17 is connected to the current detecting unit 222 is denoted by $S_R$.

As illustrated in FIGS. 21 and 22A to 22C, in a period of $t_1$ to $t_2$, electrode pairs located at positions of (2, 0) and (3, 0) and electrode pairs located at positions of (4, 2) and (5, 2) are controlled for detecting contact. In a period of $t_2$ to $t_3$, electrode pairs located at positions of (4, 0) and (5, 0) and electrode pairs located at positions of (0, 3) and (1, 3) are controlled for detecting contact. In a period of $t_3$ to $t_4$, electrode pairs located at positions of (0, 1) and (1, 1) and electrode pairs located at positions of (2, 3) and (3, 3) are controlled for detecting contact. In this way, each electrode pair is sequentially controlled for detecting contact, and detection of contact at each position on the contact face 11 is sequentially performed. In addition, in periods other than the periods in which the electrode pairs are controlled for detecting contact, electrode 17 located at positions of (1, 1), (1, 2), (2, 1), and (2, 2) are connected to the AC voltage source 272, and the other electrodes 17 are connected to the ground. As a result, a tactile sense is presented to a target area 16 within the contact face 11.

As above, also in this embodiment, in a period in which some electrodes 17 are controlled for detecting contact on the contact face 11, the other electrodes 17 are controlled for presenting a tactile sense to the contact face 11. For this reason, the tactile presentation device can simultaneously perform the presentation of a tactile sense and the detection of a contact position. In addition, the electrode 17 controlled for detecting contact on the contact face 11 is sequentially changed, and each electrode 17 is controlled for presenting a tactile sense to the contact face 11 at timings other than the timing at which the electrode 17 is controlled for detecting contact. While the presentation of a tactile sense is not performed at a position at which the detection of contact on the contact face 11 is performed, the position at which the contact is detected is sequentially moved, and accordingly, the presentation of a tactile sense is not interrupted on the whole contact face 11. Similar to Embodiment 3, a decrease in the electrostatic force occurs within a shorter period than the time resolution of a tactile sense, and a perceived electrostatic force is averaged over the whole finger to be non-zero even in a case where the electrostatic force is decreased, and accordingly, an interruption of the presentation of a tactile sense is not perceived by a user. Accordingly, also in this embodiment, the tactile presentation device can simultaneously perform the presentation of a tactile sense and the detection of a contact position, and a tactile sense felt by a user during the use of the tactile presentation device is not interrupted.

In Embodiments 3 and 4 described above, while a form in which the control circuit 21 is included in addition to the touch panel driving circuit 22, the electrode driving circuit 27, and the switching unit 28 is illustrated, the tactile presentation device may employ a form not including the control circuit 21. For example, the tactile presentation device may employ a form in which the touch panel driving circuit 22 has functions equivalent to those of the control circuit 21 or a form in which the functions equivalent to those of the control circuit 21 are included in the touch panel driving circuit 22, the electrode driving circuit 27, and the switching unit 28 in a distributed manner. Furthermore, the tactile presentation device may employ a form in which the operations of the touch panel driving circuit 22, the electrode driving circuit 27, and the switching unit 28 are directly controlled by the arithmetic operation unit 31.

In Embodiments 3 and 4, while a form in which a tactile sense is presented by applying an AC voltage to a specific electrode 17 is illustrated, the tactile presentation device may employ a form in which a tactile sense is presented using a method other than methods that are generally known. For example, the tactile presentation device may employ a form in which a tactile sense is presented by applying the same AC voltage to all the electrodes 17. In addition, the tactile presentation device may employ a form in which a tactile sense is presented by applying voltages having opposite polarities to the electrodes 17 adjacent to each other.

Furthermore, the tactile presentation device may employ a form in which a position at which an object approaches or is in contact with the contact face 11 is detected using a generally-known method other than the methods described in Embodiments 3 and 4. For example, the tactile presentation device may employ a form in which a current value of a voltage signal applied to the electrodes 17 for presenting a tactile sense is measured, and contact or approach of an object is detected according to a change in the measured current value. In Embodiments 3 and 4, while a form in which the electrodes 17 are arranged in a matrix pattern has been illustrated, the tactile presentation device may employ a form in which the electrodes 17 are arranged in any other form. For example, the tactile presentation device may employ a form in which the electrodes 17 are arranged in a shape to be represented through a tactile sense.

Embodiment 5

Figure 23:
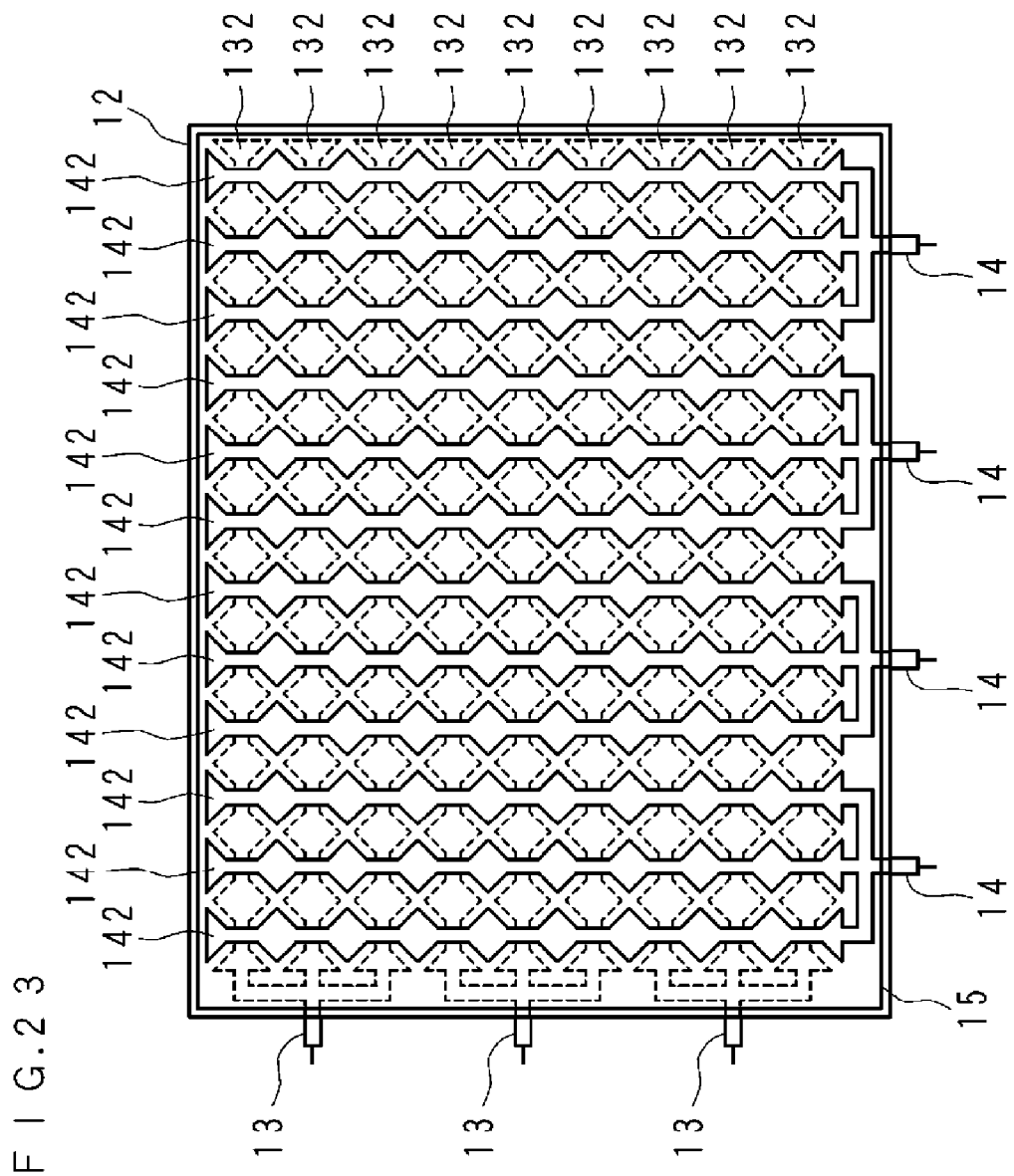
FIG. 23 is a block diagram that illustrates the internal configuration of a tactile panel according to Embodiment 5.

FIG. 23 is a block diagram that illustrates the internal configuration of a tactile panel 1 according to Embodiment 5. The configuration of a tactile presentation device according to Embodiment 5 is similar to that of Embodiment 1 or 2 except for the tactile panel 1. An X electrode 13 is configured by a plurality of sub X electrodes 132, and a Y electrode 14 is configured by a plurality of sub Y electrodes 142. The plurality of sub X electrodes 132 configuring the X electrode 13 are arranged in parallel to be adjacent to each other and are commonly connected. Similarly, the plurality of sub Y electrodes 142 configuring the Y electrode 14 are arranged in parallel to be adjacent to each other and are connected to each other. In the drawing, while an example in which the X electrode 13 is configured by three sub X electrodes 132 is illustrated, the X electrode 13 may be configured by two sub X electrodes 132 or four or more sub X electrodes 132. Similarly, the Y electrode 14 may be configured by two sub Y electrodes 142 or four or more sub Y electrodes 142. The other configurations of the tactile panel 1 are similar to those of Embodiment 1 or 2.

The operation of the tactile presentation device according to this embodiment is similar to that according to Embodiment 1 or 2. In other words, some of the X electrodes 13 and the Y electrodes 14 are controlled for detecting a position at which an object is in contact with or approaches a contact face 11, and the X electrode 13 and the Y electrode 14 controlled for detecting a contact position or an approaching position of the object are sequentially changed. At timings other than a timing at which each of X electrodes 13 and Y electrodes 14 is controlled for detecting contact, each of X electrodes 13 and Y electrodes 14 is controlled for presenting a tactile sense to the contact face 11. In this way, a plurality of sub X electrodes 132, which configure one X electrode 13, adjacent to each other and a plurality of sub Y electrodes 142, which configure one Y electrode 14, adjacent to each other are used for detecting a position, and the other sub X electrodes 132 and the other sub Y electrode 142 are used for presenting a tactile sense. Similar to Embodiments 1 and 2, also in this embodiment, the tactile presentation device can simultaneously perform the presentation of a tactile sense and the detection of a contact position, and a tactile sense felt by a user during the use of the tactile presentation device is not interrupted.

It is preferable that a distance between the centers of a plurality of sub X electrodes 132 configuring X electrodes 13 in the Y direction between the X electrodes 13 adjacent to each other is less than 10 mm such that the sub X electrode 132 used for detecting a position and the sub X electrode 132 used for presenting a tactile sense are included inside a contact portion where a user's finger touches the contact face 11. It is more preferable that this distance is less than 6 mm. Similarly, a distance between the centers of a plurality of sub Y electrodes 142 configuring Y electrodes 14 in the X direction between the Y electrodes 14 adjacent to each other is preferably less than 10 mm and is more preferably less than 6 mm.

Embodiment 6

Embodiment 6 is a modification of Embodiment 2. In Embodiment 2, in a case where a voltage is applied from the AC voltage source 224 to the X electrode 13 or the Y electrode 14 in a state in which a user's finger is not brought into contact with the contact face 11, parasitic currents flow through the parasitic capacitance of each X electrode 13 and the parasitic capacitance of each Y electrode 14, and the current detecting unit 223 detects these parasitic currents. The parasitic capacitance of an X electrode 13 is formed between the X electrode 13 and a plurality of Y electrodes 14 intersecting with the X electrode 13 and between the X electrode 13 and an X electrode 13 adjacent to the X electrode 13. The parasitic capacitance of a Y electrode 14 is formed between the Y electrode 14 and a plurality of X electrodes 13 intersecting with the Y electrode 14 and between the Y electrode 14 and a Y electrode 14 adjacent to the Y electrode 14. Depending on the design of the tactile panel 1, the value of such parasitic capacitance becomes large, and there is concern that a parasitic currents flowing through the parasitic capacitance causes a problem. Since the parasitic current may occupy most of the dynamic range of a current value that can be detected by the current detecting unit, it is preferable to decrease the parasitic current. Embodiment 6 is a form for decreasing the parasitic current.

Figure 24:
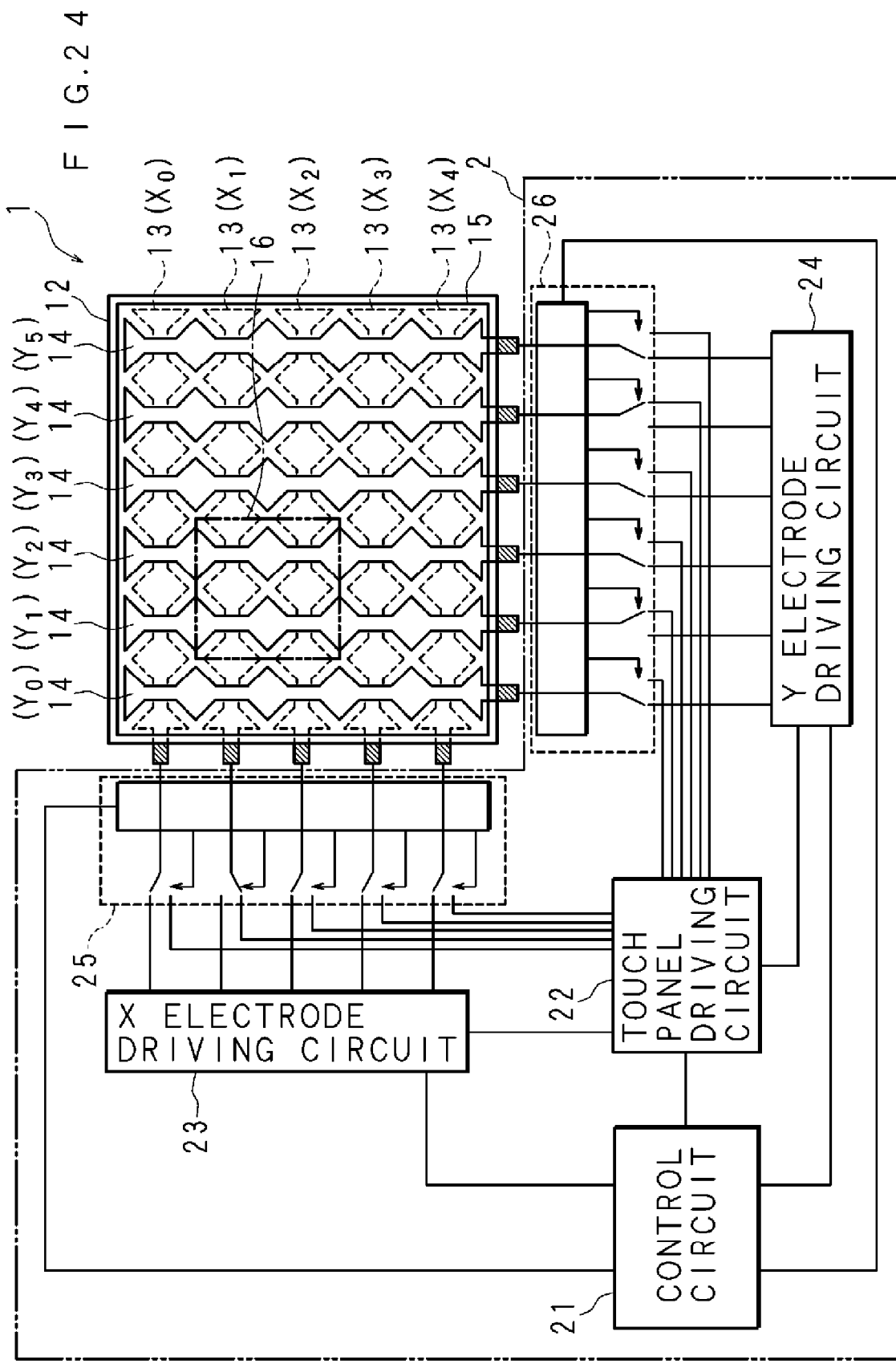
FIG. 24 is a block diagram that illustrates the internal configurations of a tactile panel and a tactile panel driving unit according to Embodiment 6.

FIG. 24 is a block diagram that illustrates the internal configurations of a tactile panel 1 and a tactile panel driving unit 2 according to Embodiment 6. An X electrode driving circuit 23 is connected to a touch panel driving circuit 22. In addition, a Y electrode driving circuit 24 is connected to the touch panel driving circuit 22. As will be described later, the internal configurations of the touch panel driving circuit 22, the X electrode driving circuit 23, and the Y electrode driving circuit 24 are different from those according to Embodiment 1 and 2. The touch panel driving circuit 22 can supply a voltage generated by an internal AC voltage source to the X electrode driving circuit 23 and the Y electrode driving circuit 24. The other parts of the tactile presentation device are similar to those according to Embodiment 1.

Figure 25:
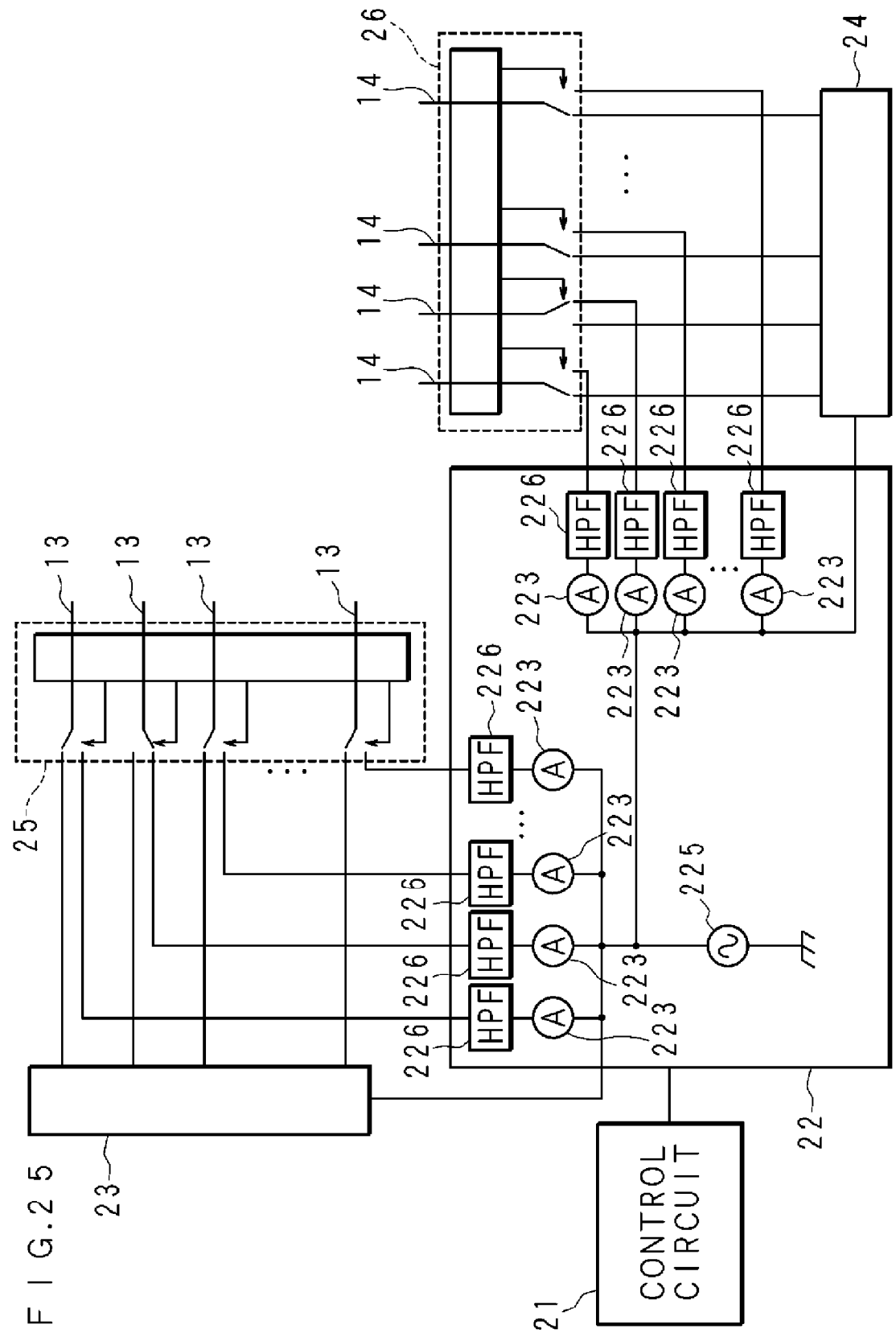
FIG. 25 is a schematic circuit diagram that illustrates the internal configuration of a touch panel driving circuit according to Embodiment 6.

FIG. 25 is a schematic circuit diagram that illustrates the internal configuration of the touch panel driving circuit 22 according to Embodiment 6. The touch panel driving circuit 22 includes an AC voltage source 225. The AC voltage source 225 is connected to a plurality of current detecting units 223. In addition, the AC voltage source 225 is connected to the X electrode driving circuit 23 and the Y electrode driving circuit 24. A high pass filter (HPF) 226 is disposed between the current detecting unit 223 and a first switching unit 25. In addition, a high pass filter 226 is disposed between the current detecting unit 223 and a second switching unit 26. The AC voltage source 225 generates an AC voltage having a higher frequency than that of a first AC voltage source 232 included in the X electrode driving circuit 23 and a second AC voltage source 242 included in the Y electrode driving circuit 24. The high pass filter 226 has characteristics for transmitting a current having the same frequency (for example, 100 kHz) as that of an AC voltage generated by the AC voltage source 225 and blocking a current having the same frequency (for example, 1000 Hz and 1240 Hz) as that of an AC voltage generated by the first AC voltage source 232 and the second AC voltage source 242. The other parts of the touch panel driving circuit 22 are similar to those according to Embodiment 1.

Figure 26:
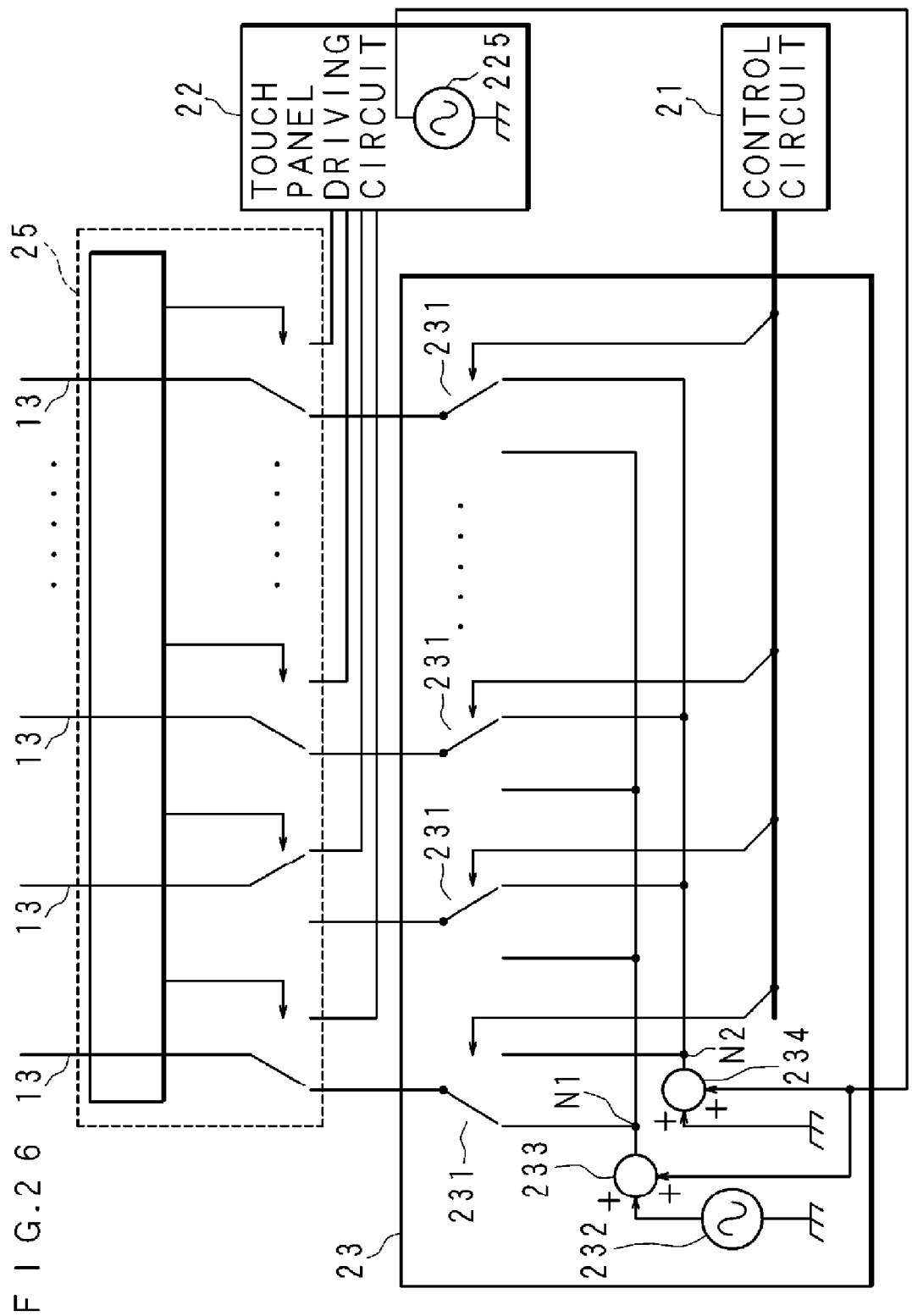
FIG. 26 is a schematic circuit diagram that illustrates the internal configuration of an X electrode driving circuit according to Embodiment 6.

FIG. 26 is a schematic circuit diagram that illustrates the internal configuration of the X electrode driving circuit 23 according to Embodiment 6. As described above, the AC voltage source 225 included in the touch panel driving circuit 22 is connected to the X electrode driving circuit 23. The X electrode driving circuit 23 includes a voltage superimposing unit 233 that superimposes a voltage generated by the AC voltage source 225 on a voltage generated by the first AC voltage source 232. In addition, the X electrode driving circuit 23 includes a voltage superimposing unit 234 that superimposes the voltage generated by the AC voltage source 225 on the ground voltage. Each single-pole double-throw switch 231 performs switching of a connection between each X electrode 13 and an output node N1 of the voltage superimposing unit 233 or an output node N2 of the voltage superimposing unit 234. The other parts of the X electrode driving circuit 23 are similar to those according to Embodiment 1.

The operations of the voltage superimposing unit 233 and the voltage superimposing unit 234 will be described. FIGS. 27A to 27D are graphs that schematically illustrate the waveforms of voltages acquired by the X electrode driving circuit 23 according to Embodiment 6. In the drawing, the horizontal axis represents the time, and the vertical axis represents the voltage. The amplitude of the AC voltage generated by the first AC voltage source 232 is assumed to be 100 V, and a first frequency f1 is assumed to be 1000 Hz. The amplitude of the AC voltage generated by the AC voltage source 225 of the touch panel driving circuit 22 is assumed to be 1 V, and the frequency is assumed to be 100 kHz. FIG. 27A schematically illustrates the waveform of the AC voltage generated by the first AC voltage source 232, and FIG. 27B schematically illustrates the waveform of the AC voltage generated by the AC voltage source 225. FIG. 27C schematically illustrates the waveform of a voltage output by the output node N1 of the voltage superimposing unit 233. The voltage output from the output node N1 is a voltage acquired by adding the AC voltage generated by the first AC voltage source 232 and the AC voltage generated by the AC voltage source 225. FIG. 27D schematically illustrates the waveform of a voltage output by the output node N2 of the voltage superimposing unit 234. The voltage output from the output node N2 is a voltage acquired by adding the voltage of the ground, for example, a voltage of 0 V and the AC voltage generated by the AC voltage source 225. In this way, the voltage superimposing unit 233 and the voltage superimposing unit 234 have a function of adding given two voltages and outputting a resultant voltage.

Figure 28:
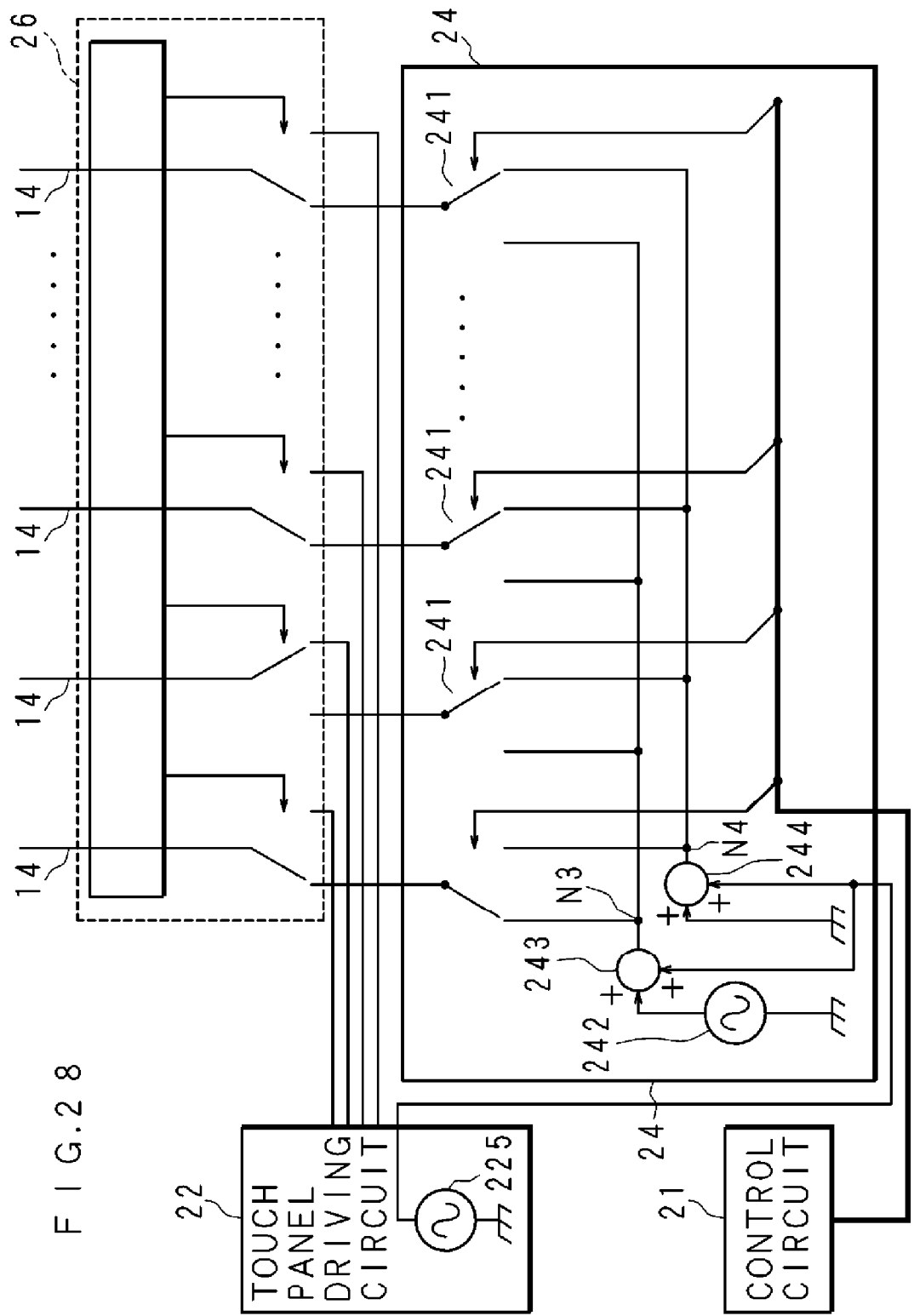
FIG. 28 is a schematic circuit diagram that illustrates the internal configuration of a Y electrode driving circuit according to Embodiment 6.

FIG. 28 is a schematic circuit diagram that illustrates the internal configuration of the Y electrode driving circuit 24 according to Embodiment 6. As described above, the AC voltage source 225 included in the touch panel driving circuit 22 is connected to the Y electrode driving circuit 24. The Y electrode driving circuit 24 includes a voltage superimposing unit 243 that superimposes the voltage generated by the AC voltage source 225 on the voltage generated by the second AC voltage source 242. In addition, the Y electrode driving circuit 24 includes a voltage superimposing unit 244 that superimposes the voltage generated by the AC voltage source 225 on the ground voltage. Each single-pole double-throw switch 241 performs switching of a connection between each Y electrode 14 and an output node N3 of the voltage superimposing unit 243 or an output node N4 of the voltage superimposing unit 244. The other parts of the Y electrode driving circuit 24 are similar to those according to Embodiment 1.

The operations of the voltage superimposing unit 243 and the voltage superimposing unit 244 will be described. FIGS. 29A to 29D are graphs that schematically illustrate the waveforms of voltages acquired by the Y electrode driving circuit 24 according to Embodiment 6. In the drawing, the horizontal axis represents the time, and the vertical axis represents the voltage. The amplitude of the AC voltage generated by the second AC voltage source 242 is assumed to be 100 V, and a second frequency f2 is assumed to be 1240 Hz. The amplitude of the AC voltage generated by the AC voltage source 225 of the touch panel driving circuit 22 is assumed to be 1 V, and the frequency is assumed to be 100 kHz. FIG. 29A schematically illustrates the waveform of the AC voltage generated by the second AC voltage source 242, and FIG. 29B schematically illustrates the waveform of the AC voltage generated by the AC voltage source 225. FIG. 29C schematically illustrates the waveform of a voltage output by the output node N3 of the voltage superimposing unit 243. The voltage output from the output node N3 is a voltage acquired by adding the AC voltage generated by the second AC voltage source 242 and the AC voltage generated by the AC voltage source 225. FIG. 29D schematically illustrates the waveform of a voltage output by the output node N4 of the voltage superimposing unit 244. The voltage output from the output node N4 is a voltage acquired by adding the voltage of the ground, for example, a voltage of 0 V and the AC voltage generated by the AC voltage source 225. In this way, the voltage superimposing unit 243 and the voltage superimposing unit 244 have a function of adding given two voltages and outputting a resultant voltage.

In Embodiment 2, the X electrode 13 is connected to one of the first AC voltage source 232, the ground, and the touch panel driving circuit 22. In contrast to this, in Embodiment 6, the X electrode 13 is connected to one of the output node N1 of the voltage superimposing unit 233, the output node N2 of the voltage superimposing unit 234, and the touch panel driving circuit 22. In a state in which the X electrode 13 is connected to the touch panel driving circuit 22, as illustrated in FIG. 27B, the AC voltage generated by the AC voltage source 225 is applied to the X electrode 13. In a state in which the X electrode 13 is connected to the output node N1, as illustrated in FIG. 27C, a voltage acquired by adding the AC voltage generated by the first AC voltage source 232 and the AC voltage generated by the AC voltage source 225 is applied to the X electrode 13. In a state in which the X electrode 13 is connected to the output node N2, as illustrated in FIG. 27D, a voltage acquired by adding the voltage of the ground voltage and the AC voltage generated by the AC voltage source 225 is applied to the X electrode 13.

In Embodiment 2, the Y electrode 14 is connected to one of the second AC voltage source 242, the ground, and the touch panel driving circuit 22. In contrast to this, in Embodiment 6, the Y electrode 14 is connected to one of the output node N3 of the voltage superimposing unit 243, the output node N4 of the voltage superimposing unit 244, and the touch panel driving circuit 22. In a state in which the Y electrode 14 is connected to the touch panel driving circuit 22, as illustrated in FIG. 29B, the AC voltage generated by the AC voltage source 225 is applied to the Y electrode 14. In a state in which the Y electrode 14 is connected to the output node N3, as illustrated in FIG. 29C, a voltage acquired by adding the AC voltage generated by the second AC voltage source 242 and the AC voltage generated by the AC voltage source 225 is applied to the Y electrode 14. In a state in which the Y electrode 14 is connected to the output node N4, as illustrated in FIG. 29D, a voltage acquired by adding the voltage of the ground voltage and the AC voltage generated by the AC voltage source 225 is applied to the Y electrode 14.

The voltage superimposing units 233, 234, 243, and 244 are configured such that the amplitudes of components of the frequency (in this embodiment 100 kHz) of the voltages generated by the AC voltage source 225 of the touch panel driving circuit 22 are the same in the voltages applied to the X electrode 13 and the Y electrode 14. In other words, voltages including a component having the same frequency and the same amplitude as those of the voltage applied to the X electrode 13 and the Y electrode 14 connected to the touch panel driving circuit 22 are applied to the X electrode 13 connected to the output node N1, the X electrode 13 connected to the output node N2, the Y electrode 14 connected to the output node N3, and the Y electrode 14 connected to the output node N4. When the frequency component of the voltage generated by the AC voltage source 225 of the touch panel driving circuit 22 is focused in the voltages applied to the X electrode 13 and the Y electrode 14, all the X electrodes 13 and the Y electrodes 14 are driven with the same amplitude and the same phase. For this reason, in a case where a voltage is applied from the AC voltage source 225 to the X electrode 13 or the Y electrode 14 in a state in which a user's finger is not brought into contact with the contact face 11, a voltage between the electrodes configuring parasitic capacitance is constant, and no current flows through the parasitic capacitance.

Here, the tactile panel 1, as illustrated in FIG. 24, is assumed to include five X electrodes $X_0$ to $X_4$ and six Y electrodes $Y_0$ to $Y_5$, and a state in which the X electrode $X_1$ is connected to the touch panel driving circuit 22 will be considered. At this time, in the X electrode $X_1$, intersections of the X electrode $X_1$ and the Y electrodes $Y_0$ to $Y_5$, an adjacent portion between the X electrode $X_1$ and the X electrode $X_0$, and an adjacent portion between the X electrode $X_1$ and the X electrode $X_2$, parasitic capacitance is formed. In addition, the X electrode $X_1$ is connected to the AC voltage source 225 through the current detecting unit 223, and the voltage generated by the AC voltage source 225 is superimposed in all the other electrodes.

Figure 30:
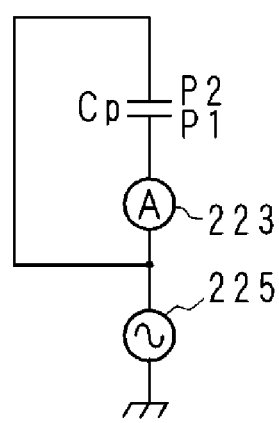
FIG. 30 is a circuit diagram acquired by modeling a state in which an X electrode $X_1$ is connected to an AC voltage source through a current detecting unit, and a voltage generated by the AC voltage source is superimposed in all the other electrodes.

FIG. 30 is a circuit diagram acquired by modeling a state in which the X electrode $X_1$ is connected to the AC voltage source 225 through the current detecting unit 223, and a voltage generated by the AC voltage source 225 is superimposed in all the other electrodes. The X electrode $X_1$ corresponds to an electrode P1 in the drawing, and all the other electrodes correspond to an electrode P2 in the drawing. Parasitic capacitance Cp is present between the electrodes P1 and P2. However, since an electric potential difference between the electrode P1 and the electrode P2 configuring the parasitic capacitance Cp does not change, a current of the component of the frequency of the voltage generated by the AC voltage source 225 does not flow through the parasitic capacitance Cp. For this reason, the current detecting unit 223 does not detect any current.

Figure 31:
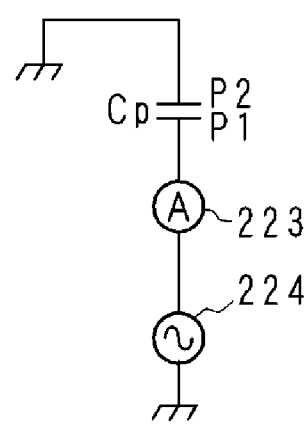
FIG. 31 is a circuit diagram that models the states of the electrodes according to Embodiment 2.

FIG. 31 is a circuit diagram that models the states of the electrodes according to Embodiment 2. In Embodiment 2, the X electrode $X_1$ is connected to the AC voltage source 224 having a frequency of 100 kHz through the current detecting unit 223, and most of the other electrodes are connected to the ground, the first AC voltage source 232 having a frequency of 1000 Hz, or the second AC voltage source 242 having a frequency of 1240 Hz. When the component of 100 kHz that is the frequency of the voltage generated by the AC voltage source 224 is focused, the state can be represented as a model in which most of the electrodes other than the X electrode $X_1$ are connected to the ground. The electrode P1 illustrated in FIG. 31 corresponds to the X electrode $X_1$, and the electrode P2 corresponds to an electrode of combining most of the other electrodes. Since an electric potential difference between the electrode P1 and the electrode P2 configuring the parasitic capacitance Cp changes, a current flows through the parasitic capacitance Cp. This current is a parasitic current that flows in a state in which a user's finger is not brought into contact with the contact face 11 in Embodiment 2.

The parasitic capacitance was measured in the tactile panel 1 according to Embodiment 6 that was actually produced, and the parasitic capacitance of one X electrode 13 was 240 pF, and the parasitic capacitance of one Y electrode 14 was 170 pF. In addition, in a case where a user's finger was brought into contact with the contact face 11, electrostatic capacitance between the electrode and the finger was 5 pF. In Embodiment 2, 240/245 of the dynamic range of the current value that can be detected by the current detecting unit 223 is occupied by a parasitic current that is basically unnecessary. In contrast to this, in Embodiment 6, the parasitic current is decreased to be almost zero, and the SN ratio of the current detected by the current detecting unit 223 is improved.

FIG. 32 is a circuit diagram that illustrates an example of the configuration of the voltage superimposing units 233 and 234 according to Embodiment 6. The voltage superimposing unit 233 is configured by a capacitor C1. One end of the capacitor C1 is connected to the output node N1, and the other end is connected to the AC voltage source 225 of the touch panel driving circuit 22. The first AC voltage source 232 is connected to the one end of the capacitor C1 and the output node N1. Resistance R1 denoted inside the first AC voltage source 232 represents the output impedance of the first AC voltage source 232. The voltage superimposing unit 234 includes a resistor R3 connected between the output node N2 and the ground, and a resister R2 connected between the output node N2 and the AC voltage source 225. The ratio between the resistor R2 and the resistor R3 is set such that, in voltages output from the output node N1 and the output node N2, the amplitudes of components of the frequency of the voltage generated by the AC voltage source 225 are the same. The voltage superimposing units 243 and 244 are similarly configured.

The configuration of the tactile presentation device for decreasing a parasitic current described in Embodiment 6 described above may be applied to Embodiment 3 in which a plurality of electrodes arranged in a matrix pattern are included. Also in the form in which the configuration for decreasing a parasitic current is applied to Embodiment 3, effects similar to those according to Embodiment 6 can be acquired. In addition, the configuration for decreasing a parasitic current described in Embodiment 6 may be applied to a tactile presentation device not including the third control unit. In other words, also in a tactile presentation device in which electrodes used for presenting a tactile sense and electrodes used for detecting contact or approach of an object are separately arranged along the contact face, the configuration for decreasing a parasitic current can be applied, and effects similar to those according to Embodiment 6 can be acquired.

In Embodiments 1 to 6 described above, while a form in which the contact face 11 is a flat face has been illustrated, the tactile presentation device may employ a form in which the contact face 11 is a curved face. In addition, in Embodiments 1 to 6, while a form in which the tactile presentation device is a computer such as a smartphone has been illustrated, the tactile presentation device may employ various forms such as a form being built in an automated teller machine (ATM) and the like. Furthermore, in Embodiments 1 to 6, while a form in which the tactile presentation device includes the display panel 36 has been illustrated, the tactile presentation device may employ a form not including the display panel 36.

According to the present disclosure, a tactile presentation device has superior effects such as being capable of simultaneously performing the presentation of a tactile sense and the detection of a contact position and not causing interrupt of a tactile sense felt by a user during the use of the tactile presentation device.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A tactile presentation device comprising:
a contact face; and
a plurality of electrodes arranged in parallel, wherein
at least one of the plurality of the electrodes is used for detecting a contact or approach of an object toward the contact face and for presenting a tactile sense to the contact face,
a first voltage signal for detecting a contact or approach of an object toward the contact face is applied to a part of the plurality of the electrodes in order to perform a scanning of the contact face,
before the scanning is completed, a second voltage signal for presenting a tactile sense to the contact face is applied to the electrode for which applying of the first voltage signal is finished, and
while the first voltage signal is applied to a part of the plurality of the electrodes, the second voltage signal is applied to the electrode for which applying of the first voltage signal is finished.

2. The tactile presentation device according to claim 1, wherein the plurality of the electrodes include:
a plurality of X electrodes arranged in parallel, and
a plurality of Y electrodes arranged in parallel to intersect the X electrodes.

* * * * *